United States Patent
Stubbendorff et al.

[19]

[11] Patent Number: 6,012,515
[45] Date of Patent: Jan. 11, 2000

[54] SYSTEM AND METHOD FOR AUTOMATICALLY CONTROLLING CABIN AIR TEMPERATURE IN AN AIRCRAFT

[75] Inventors: P. Lars R. Stubbendorff, Jupiter; Hercules Georgeou, Palm Beach Gardens; Michael D. Loschiavo, Jupiter, all of Fla.

[73] Assignee: Sikorsky Aircraft Corporation, Stratford, Conn.

[21] Appl. No.: 08/757,540

[22] Filed: Nov. 27, 1996

[51] Int. Cl.[7] .................................................. F25B 29/00
[52] U.S. Cl. ........................ 165/257; 165/254; 165/42; 165/43; 165/291; 165/256; 236/1 C; 236/13
[58] Field of Search .................... 165/257, 254, 165/42, 43, 291, 256; 236/1 C, 13

[56] References Cited

U.S. PATENT DOCUMENTS

| | | | |
|---|---|---|---|
| 2,451,566 | 10/1948 | Lehane et al. | 165/257 |
| 3,971,511 | 7/1976 | Casey . | |
| 4,893,748 | 1/1990 | Balducci . | |
| 4,978,064 | 12/1990 | Steiner . | |
| 5,156,204 | 10/1992 | Doi . | |
| 5,400,852 | 3/1995 | Nakae et al. | 165/257 |

FOREIGN PATENT DOCUMENTS 954342  4/1964  United Kingdom .

OTHER PUBLICATIONS

Product Specification Sheet—Pneutronics, "Voltage Sensitive Orifice Proportional Solenoid Valve", Parker Hannifan Corporation, 2 pages, Mar., 1995.

Excerpts from Sikorsky S–76 Maintenance Manual, SA–4047–76C–2: *Chapter 21–40: Heating and Ventilation System(including schematics).*

Section 21–40–00: Heating and Ventilation System—Description and Operation, pp. 1–8, 101–104, 119–128, (various dates, acknowledged as in existence before filing date of application).

Section 21–40–01: Bleed—Air Shutoff Valves—Description and Operation, p. 1, Nov. 30, 1994.

Section 21–40–02: Mixing Valve—Description and Operation, p. 1, Nov. 30, 1994.

Section 21–40–03: Pressure Regulator—Description and Operation, p. 1, Nov. 30, 1994.

Section 21–40–04: Low–Pressure Switches—Description and Operation, p. 1, Nov. 30, 1994.

Section 21–40–05: Time Delay Relay K24/1R—Description and Operation, p. 1, Nov. 30, 1994.

Section 21–40–06: Pneumatic Lines—Description and Operation, p. 1, Nov. 30, 1994.

*Chapter 21–50: Air Conditioning System (including schematics).*

Section 21–50–00: Air Conditioning System—Description and Operation, pp. 1–3, 115–116 Nov. 30, 1994.

Section 21–50–01: Air Condition Switch Panel—Description and Operation, p. 1, Nov. 30, 1994.

(List continued on next page.)

*Primary Examiner*—John K. Ford
*Attorney, Agent, or Firm*—Adam C. Solomon; Terrance J. Radke

[57] ABSTRACT

A system and method for automatically controlling cabin air temperature $T_{CBN}$ in an aircraft having a cabin and a mixed air delivery system. The mixed air delivery system provides a flow of mixed air having an actual mixed air temperature into the cabin. The mixed air delivery system comprises a hot bleed air sub-system for providing a flow of hot bleed air, a cool air sub-system for providing a flow of cool air, and an ambient air sub-system for providing a flow of ambient air. The method comprises the steps of defining a selected cabin air temperature $T_{CBN\ SEL}$, and then controlling the flow of hot bleed air, the flow of cool air, and the flow of ambient air such that the mixed air temperature is driven toward a target mixed air temperature defined as $k(T_{CBN\ SEL} - T_{CBN}) + T_{CBN\ SEL}$, wherein k is a gain factor.

8 Claims, 12 Drawing Sheets

OTHER PUBLICATIONS

Section 21–50–02: Load Shed Box—Description and Operation, p. 1, Nov. 30, 1994.
Section 21–50–03: Air Conditioning System Blower, p. 1, Nov. 30, 1994.
Section 21–50–04: Air Conditioning System Compressor Module—Description and Operation, p. 1, Nov. 30, 1994.
*Chapter 21–61: Temperature Control.*
Section 21–61–00: Temperature Control (Heating and Ventilation System)—Description and Operation, p. 1, Nov. 30, 1994.
Section 21–61–01: Heater Control Panel—Description and Operation, p. 1, Nov. 30, 1994.

Section 21–61–02; Cabin Temperature Selector—Description and Operation, p. 1, Nov. 30, 1994.

Section 21–61–03: Heater Control Valve—Description and Operation, p. 1, Nov. 30, 1994.

Section 21–61–04: Bleed–Air Switch—Description and Operation, p. 1, Nov. 30, 1994.

Section 21–61–05: Duct Temperature Sensor—Description and Operation, p. 1, Nov. 30, 1994.

21–61–06: Duct Temperature Limiter—Description and Operation, p. 1, Nov. 30, 1994.

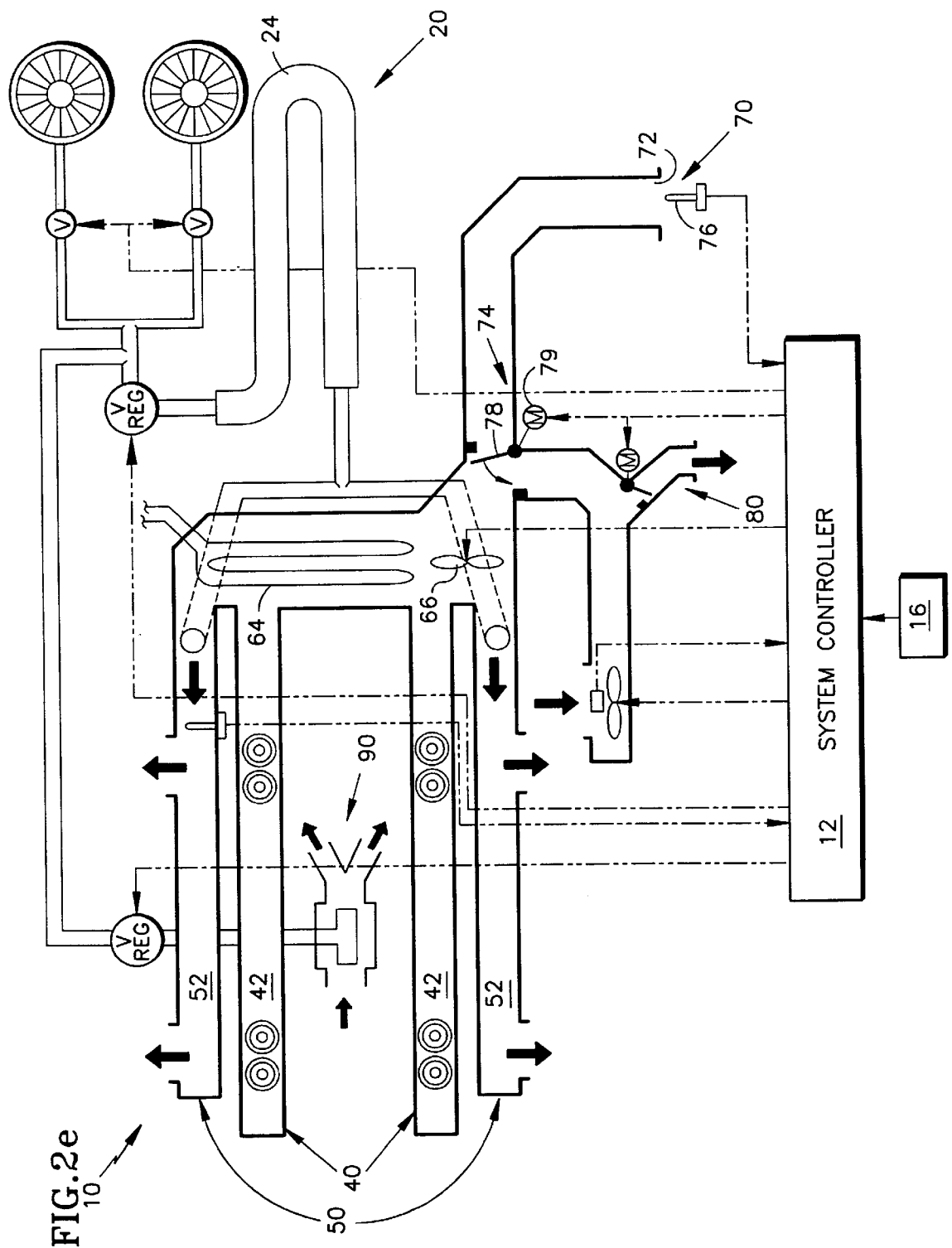

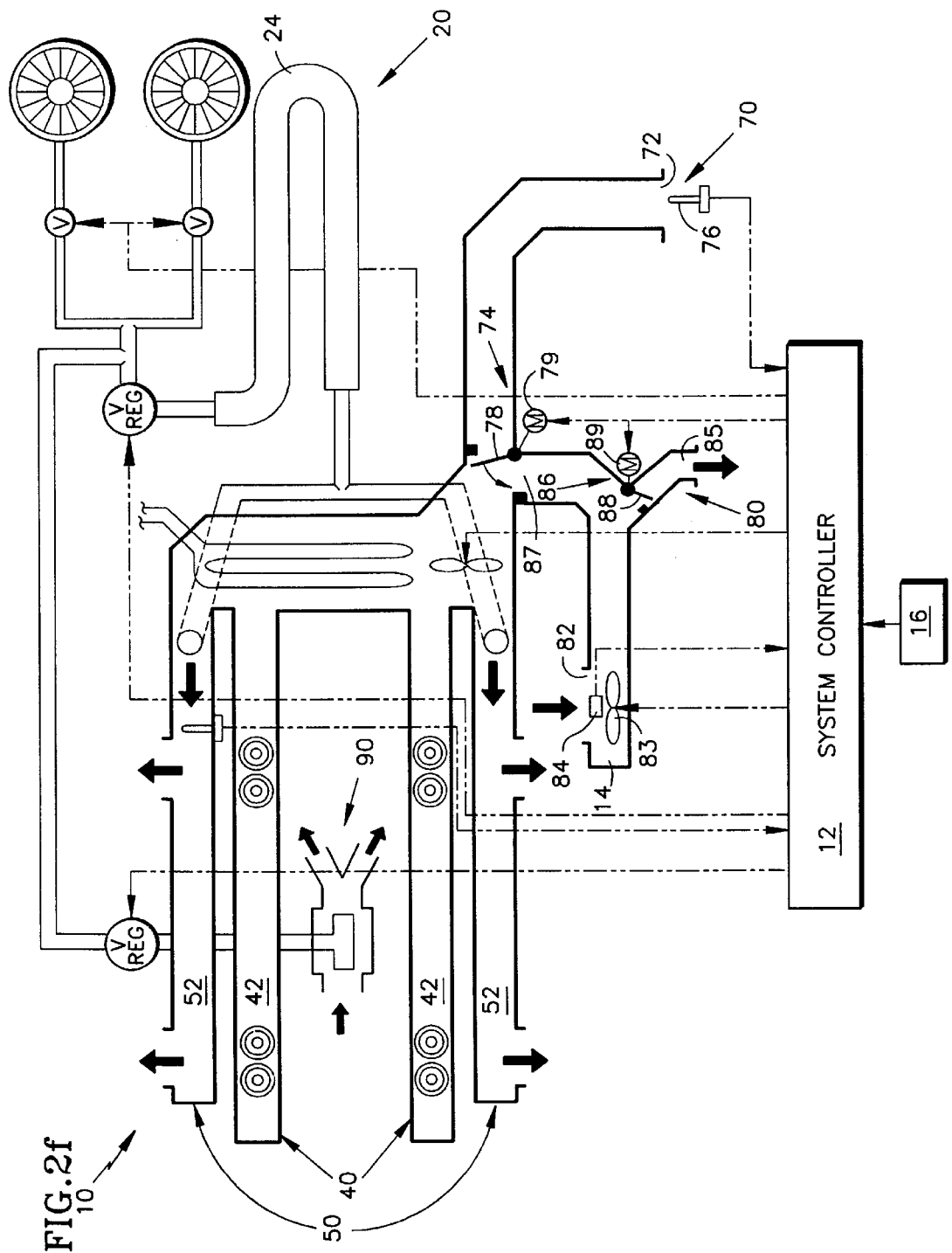

6,012,515

SYSTEM AND METHOD FOR AUTOMATICALLY CONTROLLING CABIN AIR TEMPERATURE IN AN AIRCRAFT

TECHNICAL FIELD

This invention relates generally to systems and methods for heating and cooling an aircraft cabin, and more particularly, to a system and method for automatically controlling cabin air temperature in an aircraft.

BACKGROUND ART

The air temperature inside a passenger cabin of a fixed wing or rotor aircraft may fluctuate significantly during flight operations. These temperature fluctuations depend upon physical characteristics of the aircraft in combination with operational and ambient conditions associated with the aircraft while on the ground or in flight.

Among the physical characteristics of an aircraft that can affect cabin air temperature are the extent to which the cabin is thermally insulated, the number and size of windows provided, the proximity of the engines to the cabin, and the composition of the materials employed in the construction of the aircraft. These factors allow heat to enter or escape from the cabin through convective, conductive, and/or radiation processes. These processes, in turn, depend upon operational and ambient conditions associated with the aircraft such as the outside ambient temperature, the altitude of the aircraft, the speed of the aircraft, and the extent of cloud cover when the aircraft is operating above, within, or below clouds.

In order to provide passenger comfort within the cabin, it has been known to incorporate heating and cooling systems into aircraft cabin designs. In a typical cooling system for use in an aircraft cabin, the cooling system comprises a manually adjustable system for circulating ambient air within the cabin, alone or in combination with cool air provided by an air conditioning unit located within the aircraft. In these cooling systems, it is typical for the ambient air to enter the aircraft through an ambient air inlet and to circulate about the cabin through the use of fans or blowers. These fans or blowers may also be used in combination with the air conditioning unit to circulate cool air, or cool air mixed with ambient air, about the cabin.

Adjustment of these prior art cooling systems is strictly manual, in that an operator of this type of cooling system must manually select a combination of system settings that the operator believes will increase passenger comfort. These system settings include the rate at which ambient air is allowed to enter the aircraft, the speed settings of the various circulation fans or blowers, and if an air conditioning unit is used, the rate at which the air conditioner's compressor supplies refrigerant to the air conditioner's evaporator coils.

A drawback to these prior art cooling systems lies in that these systems are unable to automatically compensate for dynamic operational and ambient conditions associated with the aircraft that result in temperature changes within the aircraft cabin. For example, during the operation of a rotorcraft, the ambient temperature surrounding the rotorcraft changes as a function of the altitude of the rotorcraft. In addition, since a rotorcraft typically utilizes large expanses of glass, solar radiation becomes a factor as the rotorcraft operates above cloud cover. These dynamic changes can occur very rapidly since one advantage of a rotorcraft is its vertical maneuverability. Therefore, an operator of a prior art cooling system would have to manually adjust the cooling system's settings as the cabin temperature changes in response to these dynamic changes in the operational and ambient conditions associated with the rotorcraft. These manual adjustments may not necessarily improve passenger comfort, since these dynamic changes can occur at a rate that is faster than the rate at which an operator can input the system setting adjustments and the rate at which the cabin temperature is able to reflect these manual adjustments.

In a typical heating system for an aircraft having a turbine engine, heat is provided to the cabin through a manually adjustable heating system that directs hot bleed air from the turbine engine's compressor into the cabin. Adjustment of the heating system is achieved by manually regulating the flow of bleed air into the cabin with bleed air valves. As with the prior art cooling systems discussed above, the prior art heating systems also strictly rely upon manual adjustments. In addition, as with the prior art cooling systems, the prior art heating systems are unable to automatically compensate for dynamic operational and environmental conditions associated with the aircraft that alter the temperature within the aircraft cabin.

In particular, the power settings of the turbine engine(s) impact the effectiveness of the prior art heating systems. It is known in the art that the temperature and flow rate of bleed air is a function of the power setting of the turbine engine supplying the bleed air. Therefore, for a given set of operational conditions, the temperature and flow rate of the bleed air may be greater or less than the heating needs of the aircraft. In addition, it is known that decreasing the diversion of bleed air from a compressor of a turbine engine increases engine efficiency. Therefore, if it becomes necessary in certain operational situations to increase engine efficiency, the flow of bleed air available for heating purposes will be reduced. Since the prior art heating systems rely on manual adjustment, it becomes very difficult for an operator to properly adjust the system controls in response to dynamic changes in both ambient and operational conditions associated with the aircraft, e.g., changes in bleed air temperature and flow rate.

DISCLOSURE OF THE INVENTION

It is therefore an object of the present invention to provide a system and method for automatically controlling cabin air temperature in an aircraft.

Another object of the present invention is to provide a system and method for automatically controlling cabin air temperature in an aircraft that is automatically responsive to dynamic changes in operational and ambient conditions associated with the aircraft.

These and other objects are achieved in the present invention, a system for automatically controlling cabin air temperature in an aircraft having an ambient air inlet providing a flow of ambient air, an exhaust outlet, and a turbine engine for providing a flow of hot bleed air into first and second bleed air conduits. The system comprises a system controller for controlling the system, and a bleed air shutoff valve disposed in combination with the first and the second bleed air conduits, wherein the bleed air shutoff valve has an open position and a closed position, and wherein the bleed air shutoff valve is electrically connected to the system controller such that the bleed air shutoff valve is capable of receiving electrical signals from the system controller for switching the bleed air shutoff valve between the open position and the closed position. A regulator valve assembly is disposed in combination with the first bleed air conduit for regulating the flow of hot bleed air, wherein the regulator valve assembly is electrically connected to the system controller such that the regulator valve assembly is capable of receiving electrical signals from the system controller for regulating the flow of hot bleed air through the first bleed air conduit.

Also provided is an auxiliary heater connected to the second bleed air conduit, and an auxiliary heater regulator valve assembly disposed in combination with the second bleed air conduit for regulating the flow of hot bleed air to the auxiliary heater, wherein the auxiliary heater regulator valve assembly is electrically connected to the system controller such that the auxiliary heater regulator valve assembly is capable of receiving electrical signals from the system controller for regulating the flow of hot bleed air through the second bleed air conduit.

The system for automatically controlling cabin air temperature in an aircraft also comprises an air conditioning sub-system for providing a flow of cool air. The air conditioning sub-system has a compressor, evaporator and an evaporator fan having a plurality of speeds, wherein the compressor has an active setting and an inactive setting. The air conditioning sub-system is electrically connected to the system controller such that the air conditioning sub-system is capable of receiving electrical signals from the system controller for defining the speed of the fan and for defining the setting of the compressor.

An ambient air temperature sensor is provided for sensing ambient air temperature, wherein the ambient air temperature sensor is electrically connected to the system controller, and wherein the ambient air temperature sensor is capable of delivering an electrical signal to the system controller indicative of the ambient air temperature. A cabin air temperature sensor is provided for sensing cabin air temperature in the aircraft, wherein the cabin air temperature sensor is electrically connected to the system controller, and wherein the cabin air temperature sensor is capable of delivering an electrical signal to the system controller indicative of the cabin air temperature.

Also provided is a primary duct sub-system connected to the air conditioning sub-system and the ambient air inlet, and a secondary duct sub-system connected to the air conditioning sub-system, the ambient air inlet, and the first bleed air conduit, wherein the flow of hot bleed air, the flow of cool air, and the flow of ambient air are selectively mixed together within the secondary duct sub-system to form a flow of mixed air having an actual mixed air temperature. A secondary duct temperature sensor is disposed within the secondary duct for sensing the actual mixed air temperature, wherein the secondary duct temperature sensor is electrically connected to the system controller and is capable of delivering an electrical signal to the system controller indicative of the actual mixed air temperature.

A method for automatically controlling cabin air temperature in an aircraft is also provided, wherein the aircraft has an ambient air inlet, an exhaust outlet, an auxiliary heater, a turbine engine providing a flow of hot bleed air, a bleed air shutoff valve, a regulator valve assembly for regulating the flow of hot bleed air, and an air conditioning sub-system for providing a flow of cool air, the air conditioning sub-system having a compressor, evaporator and an evaporator fan having low, medium and high speeds. The method comprises the steps of defining a selected cabin air temperature, sensing an ambient air temperature, comparing the ambient air temperature with a first ambient air switch point temperature, ensuring that an air conditioning mode is initiated if the ambient air temperature is greater than the first ambient air switch point temperature, ensuring that a heating mode is initiated if the ambient air temperature is equal to or less than the first ambient air switch point temperature, and returning to the ambient air temperature sensing step.

Still other objects and advantages of the present invention will become readily apparent to those skilled in this art from the following detailed description, wherein preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BRIEF DESCRIPTION OF THE DRAWINGS

FIG. 2e is a schematic view of the ambient air inlet sub-system depicted in FIG. 2;

FIG. 2f is a schematic view of the exhaust sub-system depicted in FIG. 2;

BEST MODE FOR CARRYING OUT THE INVENTION

Figure 1:
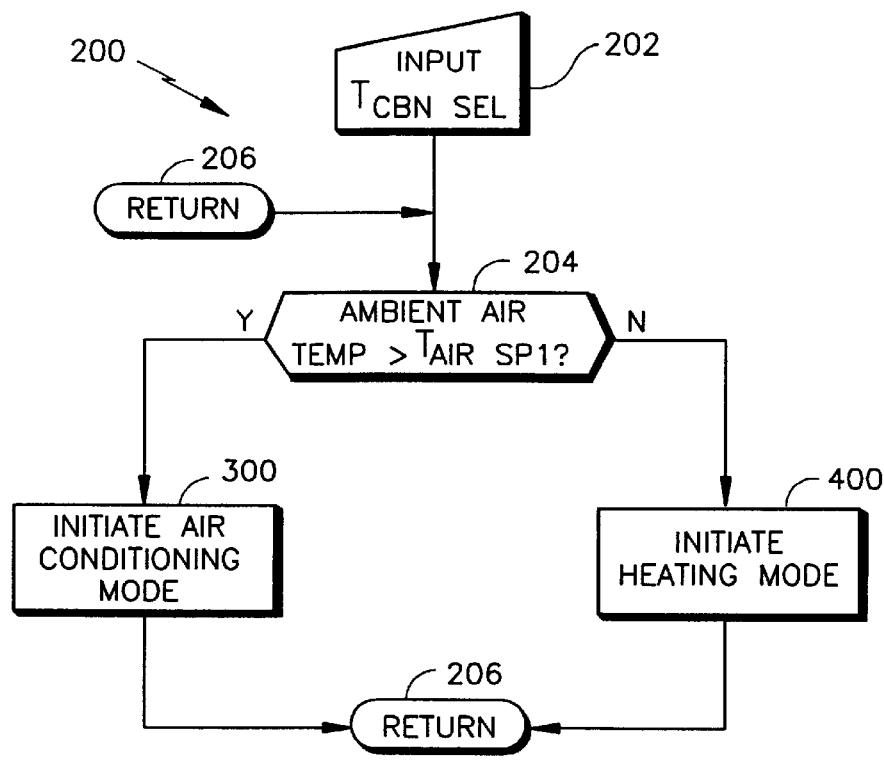
FIG. 1 is a flowchart diagram illustrating a method for automatically controlling cabin air temperature in an aircraft, embodying features of the present invention, and having an air conditioning mode and a heating mode.

FIG. 1 depicts a flowchart diagram 200 illustrating a method for automatically controlling cabin air temperature $T_{CBN}$ in an aircraft (not shown), embodying features of the present invention. In particular, flowchart diagram 200 illustrates a method for selecting between an air conditioning mode 300 and a heating mode 400 in response to a particular set of parameters.

Figure 2:
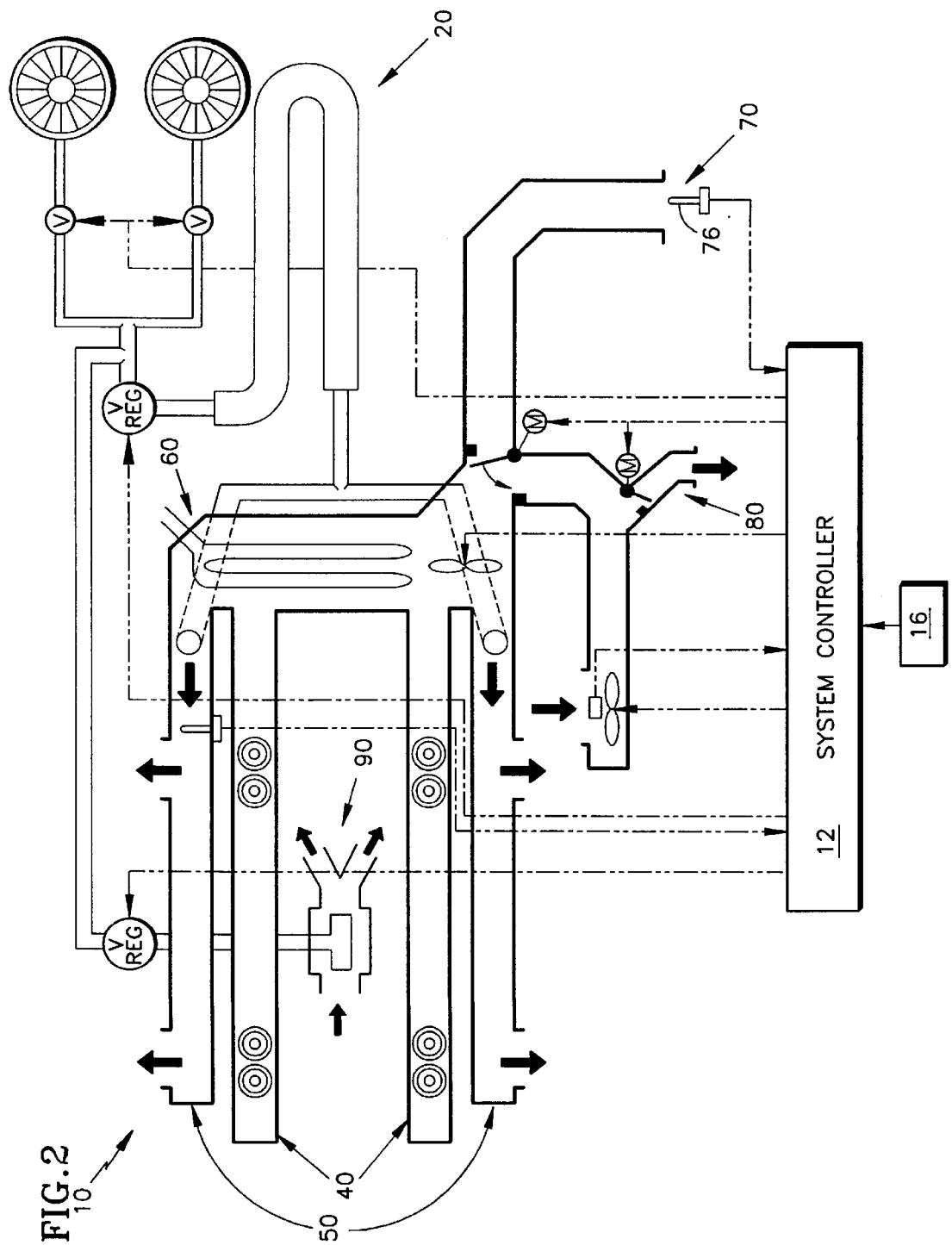
FIG. 2 is a schematic view of a system for controlling cabin air temperature in an aircraft, exemplary of a system capable of carrying out the method illustrated in FIG. 1.

Referring now to FIG. 2, a system 10 for automatically controlling cabin air temperature in a Sikorsky® S-76® helicopter (Sikorsky® and S-76® are registered trademarks of the Sikorsky Aircraft Corporation) is depicted, exemplary of a system capable of carrying out the method of the present invention. The automatic cabin temperature control system 10 comprises a bleed air delivery sub-system 20, a primary duct sub-system 40, a secondary duct sub-system 50, an air conditioning sub-system 60, an ambient air inlet sub-system 70, an exhaust sub-system 80, an auxiliary heating sub-system 90, and a system controller 12.

Figure 2A:
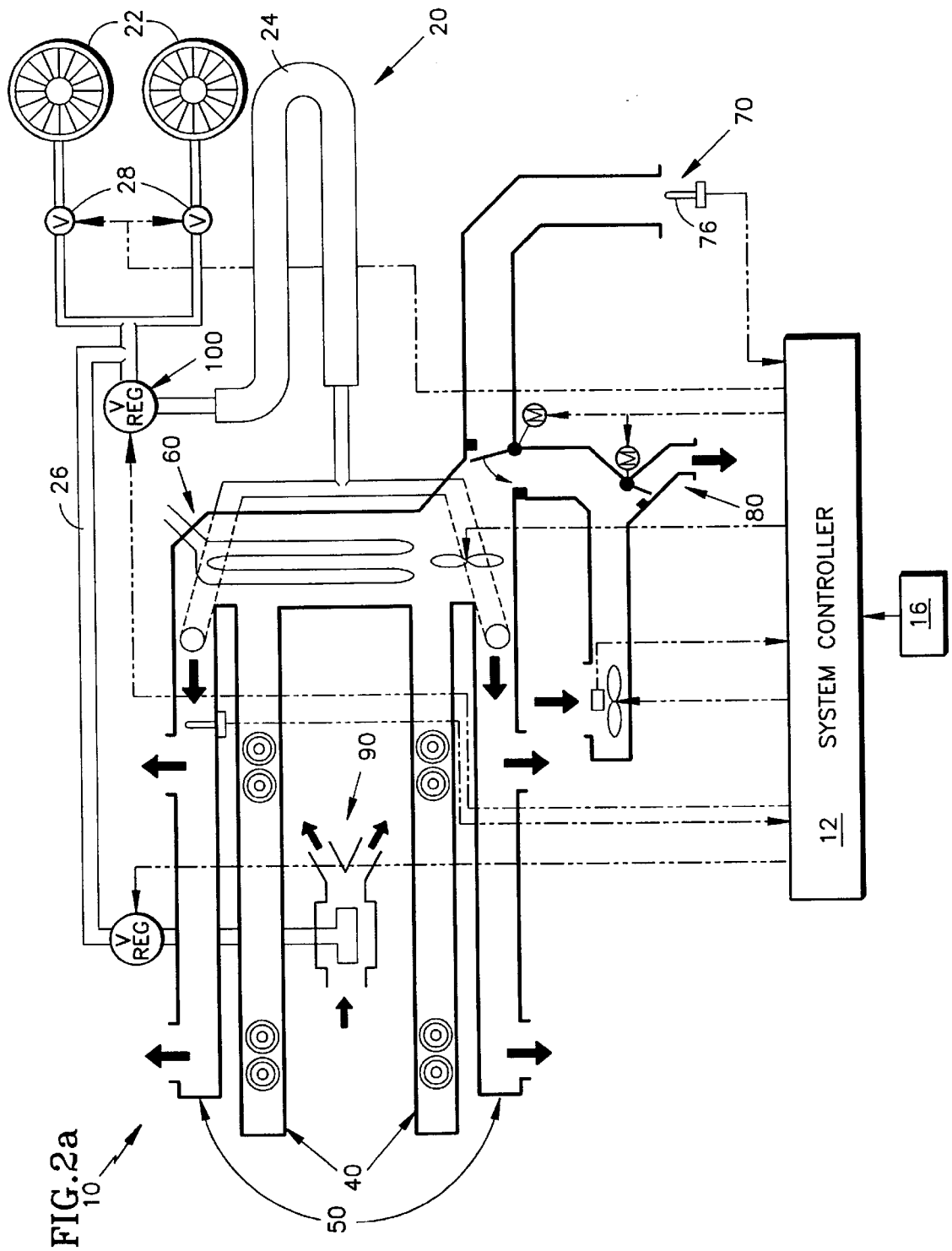
FIG. 2a is a schematic view of the bleed air delivery sub-system depicted in FIG. 2.

Referring to FIG. 2a, the bleed air delivery sub-system 20 comprises two turbine engines 22, each having a compressor section (not shown), and first and second bleed air conduits 24, 26 connected to the compressor sections of the turbine engines 22 such that a flow of hot bleed air is directed from the compressor sections into the first and second bleed air conduits 24, 26. Two bleed air shutoff valves 28 are disposed proximal to the turbine engines 22 such that the flow of hot bleed air from each turbine engine 22 entering the first and second bleed air conduits 24, 26 can be controlled. In the described embodiment, the bleed air shutoff valves 28 comprise solenoid valves electrically connected to the system controller 12. In this embodiment, the bleed air shutoff valves 28 assume a fully-closed configuration upon the delivery of a predetermined voltage from the system controller 12 to the solenoid valve, thereby "energizing" the solenoid valve. When the system controller 12 discontinues the delivery of the predetermined charge to the solenoid valves, thereby "de-energizing" the solenoid valves, the bleed air shutoff valves 28 assume a fully-open configuration.

The bleed air delivery sub-system 20 also comprises a regulator valve assembly 100 disposed in combination with the first bleed air conduit system 24 such that it can regulate the flow of hot bleed air into the secondary duct sub-system 50. Unlike the bleed air shutoff valves 28, which are only capable of assuming either a fully-open or fully-closed configuration, the regulator valve assembly 100 is capable of assuming configurations of various gradations.

Figure 5:
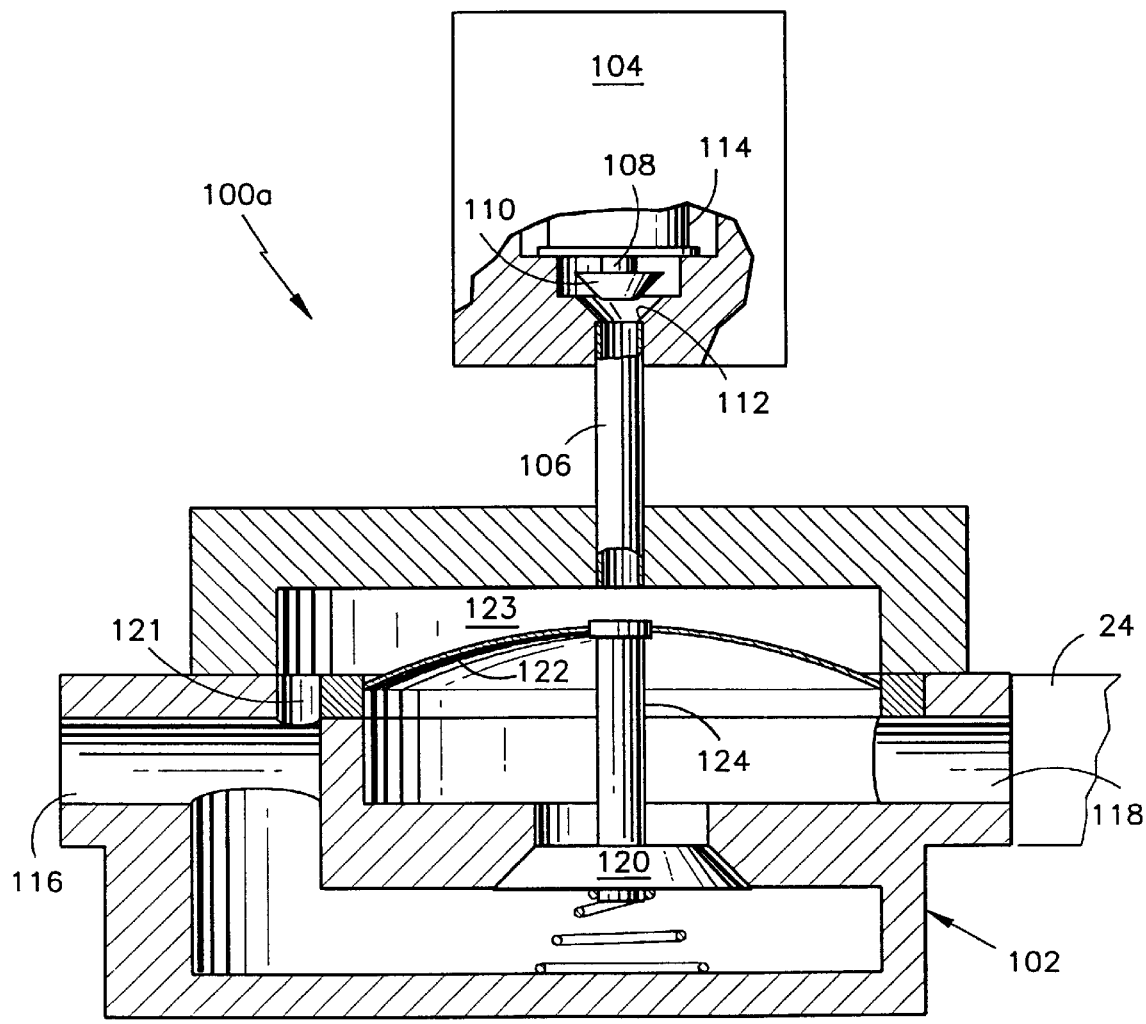
FIG. 5 is a plan view, partly broken away, and partly in section, of the regulator valve assembly depicted in FIG. 2.

In the described embodiment, as depicted in FIGS. 2a and 5, the regulator valve assembly 100a comprises a regulator valve 102 connected to a solenoid-operated proportional valve 104 (such as the Voltage Sensitive Orifice manufactured by the Pneutronics Division of the Parker Hannifan Corporation) by a connection tube 106. The solenoid-operated proportional valve 104 comprises a plunger 108 having a plunger head 110 adapted to fit an orifice 112 defining one end of the connection tube 106. The plunger 108 is disposed within the solenoid-operated proportional valve 104 such that it is capable of linear translation in response to magnetic fields created by an electrically conductive coil 114 disposed about the plunger 108. An electrical charge is supplied to the coil 114 through an electrical connection between the coil 114 and the system controller 12. In the described embodiment, the linear translation of the plunger 108 is proportional to the voltage delivered to the coil 114 by the system controller 12, such that upon delivery of a predetermined voltage step to the coil 114 from the system controller 12, the plunger 108 will accordingly translate linearly a predetermined length. In particular, the coil 114 should be disposed about the plunger 108 such that when the system controller 12 increases the voltage by a step, the plunger 108 responds by linearly translating away from the orifice 112, and when the system controller 12 decreases the voltage by a step, the plunger 108 responds by linearly translating towards the orifice 112.

The regulator valve 102 comprises a bleed air inlet 116, a bleed air outlet 118, a spring biased valve 120 interposed between the bleed air inlet 116 and the bleed air outlet 118, a diaphragm 122 connected to the spring biased valve 120 with a rigid stem 124, and a restrictor tube 121 for directing a flow of hot bleed air from the bleed air inlet 116 into a region 123 of the regulator valve 102 above the diaphragm 122. The diaphragm 122 is disposed in combination with the spring biased valve 120 and stem 124 such that downward movement of the diaphragm 122 results in corresponding downward movement of the spring biased valve 120, thereby increasing the flow of hot bleed air from the bleed air inlet 116 to the bleed air outlet 118. Conversely, upward movement of the diaphragm 122 results in corresponding upward movement of the spring biased valve 120, thereby decreasing the flow of hot bleed air from the bleed air inlet 116 to the bleed air outlet 118. These upward and downward movements of the diaphragm 122 are controlled through the application of pressure differentials to the upper and lower surfaces of the diaphragm 122.

The pressure applied to the lower surface of the diaphragm 122 is a function of the position of the spring biased valve 120 and the pressure of the hot bleed air at the bleed air inlet 116. The pressure applied to the upper surface of the diaphragm 122 is a function of the pressure in the region 123 above the diaphragm 122, the pressure applied to the lower surface of the diaphragm 122, and the ability of air displaced by upward movement of the diaphragm 122 to flow out of the regulator valve 102 and through the connection tube 106. Specifically, as the diaphragm 122 moves upward, air near the upper surface of the diaphragm 122 is displaced away from the diaphragm 122 and forced into the connection tube 106 toward the solenoid-operated proportional valve 104. As noted above, the other end of the connection tube 106 comprises the orifice 112 within the solenoid-operated proportional valve 104.

Therefore, when the plunger 108 translates away from the orifice 112 in response to electrical signals from the system controller 12, thereby increasing the space between the plunger head 110 and the orifice 112, the displaced air within the connection tube 106 is allowed to bleed off at a rapid rate, thereby ensuring that the diaphragm can move upward. However, if the plunger 108 translates toward the orifice 112, such that the space between the plunger head 110 and the orifice 112 is decreased, the displaced air within the connection tube 106 will bleed off at a slower rate, thereby inhibiting the ability of the diaphragm 122 to move upward.

In operation, the regulator valve 102 works in cooperation with the solenoid-operated proportional valve 104 such that the ability of the diaphragm 122 to move up and down, and accordingly the ability of the spring biased valve 120 to regulate the flow of hot bleed air, is a function of the linear translation of the plunger 108 within the solenoid-operated proportional valve 104. Specifically, when the plunger 108 linearly translates towards the orifice 112, the flow rate of hot bleed air through the regulator valve 102 increases. Conversely, when the plunger 108 linearly translates away from the orifice 112, the flow rate of hot bleed air through the regulator valve 102 decreases.

In the described embodiment, each voltage step comprises 0.1 volts, and the relationship between the voltage steps and the linear translation of the plunger 108 is such that twenty voltage steps are necessary for full linear translation of the plunger 108 between a fully-open configuration, characterized by the plunger head 110 being fully disengaged from the orifice 112, and a fully-closed configuration, characterized by the plunger head 110 being fully engaged with the orifice 112.

Figure 2B:
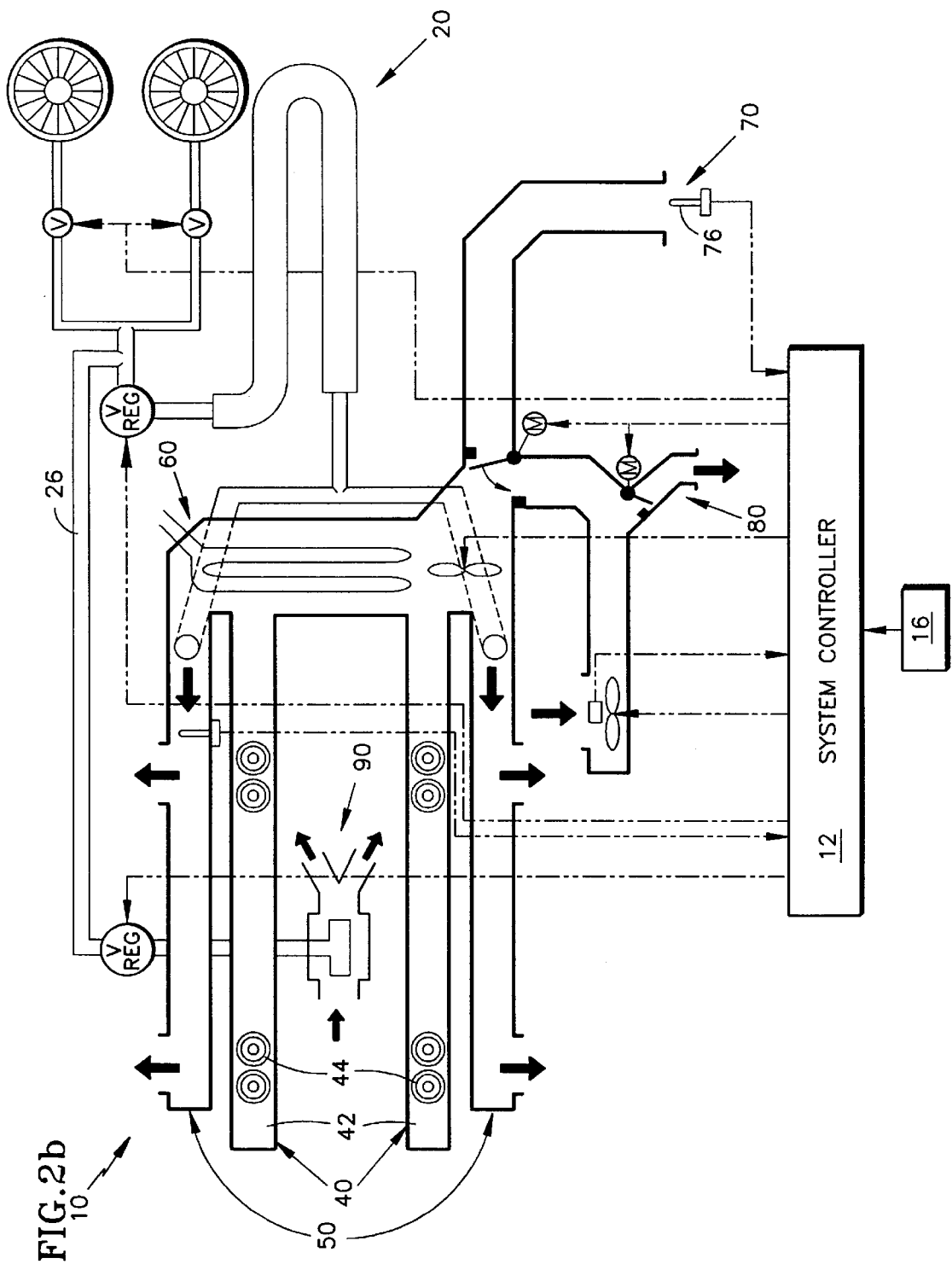
FIG. 2b is a schematic view of the primary duct sub-system depicted in FIG. 2.

Referring to FIG. 2b, the primary duct sub-system 40 comprises primary ducts 42 connected to the air conditioning sub-system 60 and the ambient air inlet sub-system 70 such that cold air and/or ambient air is circulated through the primary duct sub-system 40. Adjustable ceiling registers 44 are disposed in combination with the primary ducts 42 at discrete locations corresponding to each passenger seat (not shown), such that the cool and/or ambient air is accessible by the passengers within the cabin. In the described embodiment, the adjustable ceiling registers 44 comprise WEMAC® adjustable air outlets manufactured by the Puritan-Bennet Aero Systems Company (WEMAC® is a registered trademark of the Puritan-Bennet Aero Systems Company).

Figure 2C:
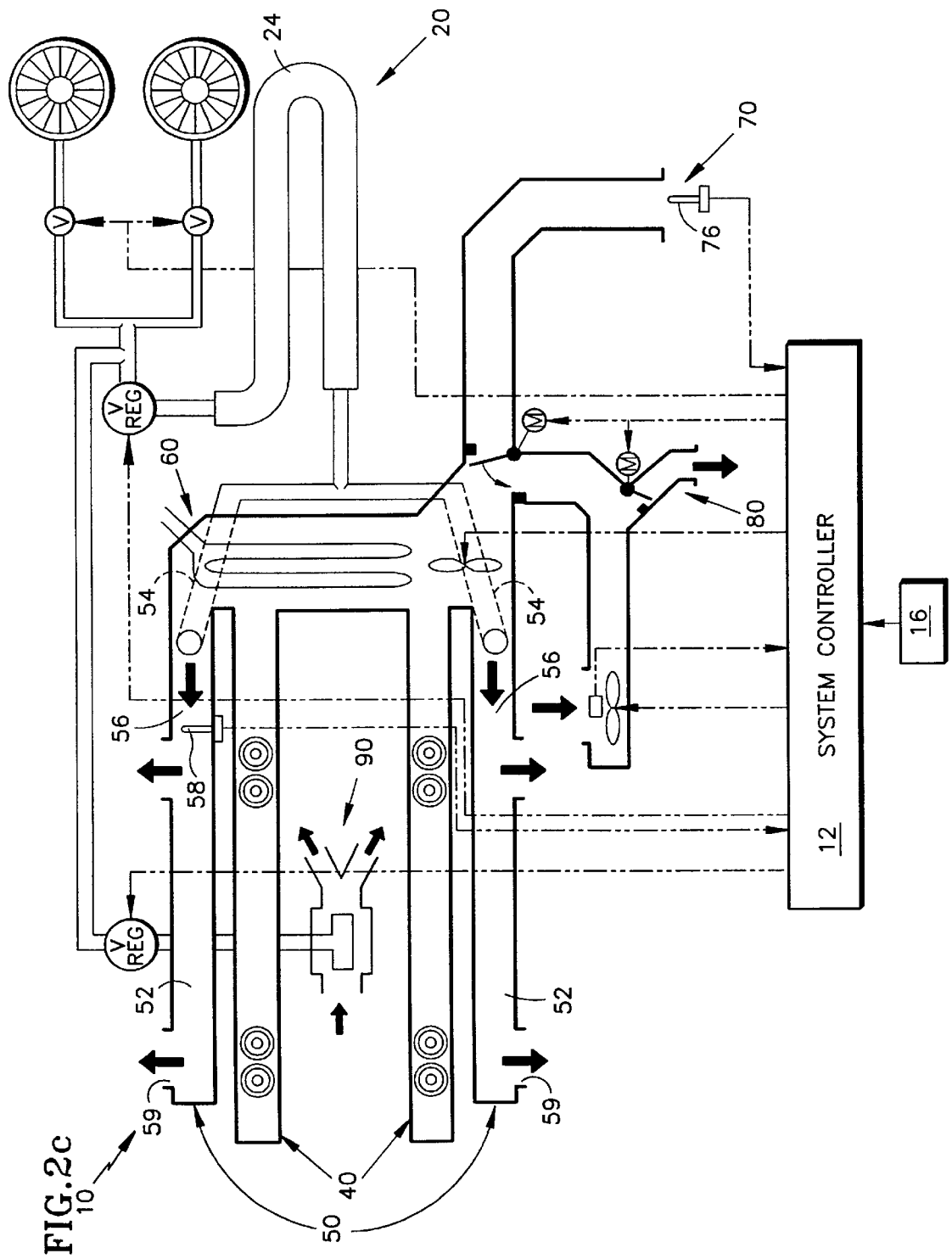
FIG. 2c is a schematic view of the secondary duct sub-system depicted in FIG. 2.

Referring to FIG. 2c, the secondary duct sub-system 50 comprises secondary ducts 52 connected to the air conditioning sub-system 60, ambient air inlet sub-system 70, and the first bleed air conduit 24 using a plurality of baffles 54. In operation, as hot bleed air is directed from the first bleed air conduit 24 into the secondary ducts 52, the hot bleed air mixes with cool air and/or ambient air to form mixed air within mixing regions 56 of the secondary ducts 52. A secondary duct temperature sensor 58 is disposed within one of the mixing regions 56 and is electrically connected to the system controller 12 such that the secondary duct temperature sensor 58 senses the temperature of the mixed air within the mixing region 56, and provides to the system controller 12 an electrical signal indicative of an actual mixed air temperature $T_{MIX\ ACT}$. Secondary duct vents 59 are disposed in combination with the secondary ducts 52 such that the mixed air is delivered into the passenger cabin. In the described embodiment, the secondary duct vents 59 comprise fixed waterfall-type vents integrated into the ceiling of the S-76 helicopter's passenger cabin.

Figure 2D:
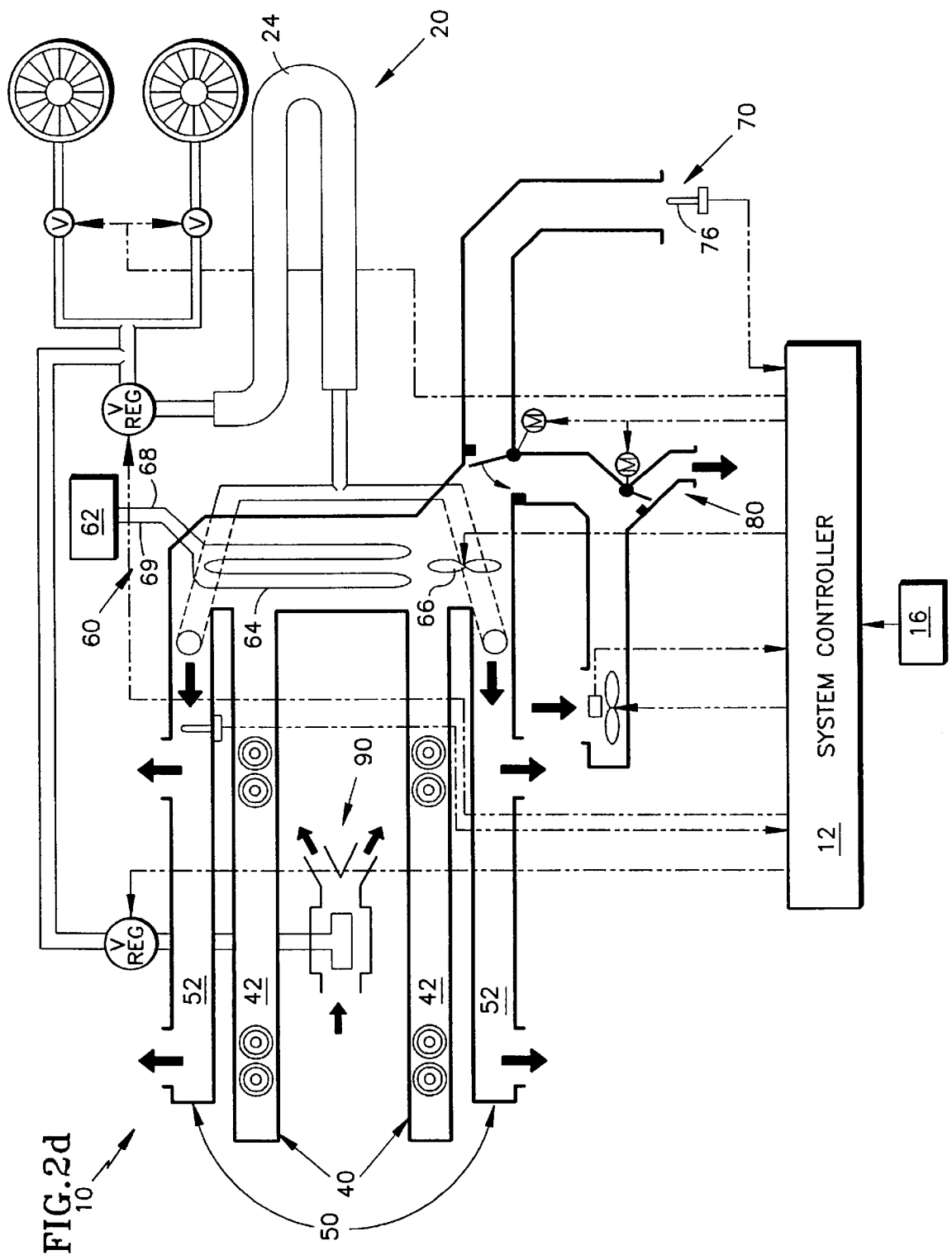
FIG. 2d is a schematic view of the air conditioning sub-system depicted in FIG. 2.

Referring to FIG. 2d, the air conditioning sub-system 60 comprises a compressor 62 disposed in fluid communication with evaporator coils 64, wherein the evaporator coils 64 are disposed in combination with an evaporator fan 66 having low, medium, and high fan-speed settings. In operation, the compressor 62 pumps refrigerant into an evaporator coil inlet 68 and receives the refrigerant through an evaporator coil outlet 69, thereby providing for a closed loop refrigerant circuit. The evaporator fan 66 is disposed proximal to the evaporator coils 64 such that when the evaporator fan 66 is in operation, the evaporator fan 66 supplies a flow of air that passes over the evaporator coils 64 and into the primary and secondary ducts 42, 52. As the flow of air supplied by the evaporator fan 66 passes over the evaporator coils 64, the refrigerant extracts heat from the flow of air, thereby providing a flow of cool air into the primary and secondary ducts 42, 52. In the described embodiment, the compressor 62 and the evaporator fan 66 are electrically connected to the system controller 12 such that the system controller 12 controls the operation of the air conditioning sub-system 60, including the evaporator fan 66 speed and the activation status of the compressor 62. In the described embodiment for the S-76 helicopter, the air conditioning sub-system 60 comprises a single vapor cycle air conditioner providing approximately 6155 W (21,000 BTU/h).

Referring to FIG. 2e, the ambient air inlet sub-system 70 comprises an ambient air inlet 72, an ambient air inlet valve assembly 74, and an ambient air temperature sensor 76. The ambient air inlet 72 is disposed at an outside surface of the S-76 helicopter such that ambient air enters the ambient air inlet sub-system 70 through the ambient air inlet 72. The ambient air temperature sensor 76 is electrically connected to the system controller 12, and is disposed proximal to the ambient air inlet 72 such that it senses the temperature of the ambient air and provides an electrical signal to the system controller 12 indicative of ambient air temperature.

The ambient air inlet valve assembly 74 is interposed between the ambient air inlet 72 and the primary and secondary duct sub-systems 40, 50 such that the ambient air inlet valve assembly 74 selectively controls the flow of ambient air into the primary and secondary ducts 42, 52. The ambient air inlet valve assembly 74 comprises an ambient air inlet valve 78 disposed in combination with an ambient air inlet valve motor 79. The ambient air inlet valve motor 79 is electrically connected to the system controller 12 such that the system controller 12 controls the opening and closing of the ambient air inlet valve 78. When the ambient air inlet valve 78 is in the open position, ambient air is allowed to enter the primary and secondary ducts 42, 52. When the ambient air inlet valve 78 is closed, ambient air is prevented from entering the primary and secondary ducts 42, 52. In addition to functioning as part of the ambient air inlet sub-system 70, as will be discussed more fully below, the ambient air inlet valve assembly 74 also works in combination with the exhaust sub-system 80.

Referring to FIG. 2f, the exhaust sub-system 80 comprises an exhaust inlet 82, an exhaust inlet fan 83, a cabin air temperature sensor 84, an exhaust outlet 85, an exhaust outlet valve assembly 86, a cabin air recirculation inlet 87, and the ambient air inlet valve assembly 74. In the described embodiment, the exhaust inlet 82, exhaust inlet fan 83, and the cabin air temperature sensor 84 are disposed in an armrest 14 of a passenger seat in the S-76 helicopter passenger cabin such that operation of the exhaust inlet fan 83 prevents the stagnation of cabin air by the cabin air temperature sensor 84. The exhaust inlet fan 83 is electrically connected to the system controller 12 such that the system controller 12 controls the operation of the exhaust inlet fan 83, and thereby the flow of cabin air over the cabin air temperature sensor 84. The cabin air temperature sensor 84 is also electrically connected to the system controller 12, such that the cabin air temperature sensor 84 senses the temperature of the air in the cabin and provides an electrical signal to the system controller 12 indicative of cabin air temperature $T_{CBN}$.

The exhaust outlet 85 is disposed at an outside surface of the S-76 helicopter such that cabin air can be directed out of the helicopter into the ambient air surrounding the helicopter. In the described embodiment, the exhaust outlet 85 comprises a N.A.C.A. exhaust, whereby the shape of the exhaust outlet 85 creates a fluid ejector. The shape of the exhaust outlet 85 along the outside surface of the helicopter is such that an area of low pressure is formed, thereby creating a pressure differential between the air inside the exhaust sub-system 80 and the air at the exhaust outlet 85. This pressure differential creates a condition wherein cabin air that enters the exhaust sub-system 80 through the exhaust inlet 82 is directed out of the helicopter through the exhaust outlet 85. The exhaust outlet valve assembly 86 is disposed proximal to the exhaust outlet 85 such that the exhaust outlet valve assembly 86 controls the flow of cabin air out of the helicopter through the exhaust outlet 85. The exhaust outlet valve assembly 86 comprises an exhaust outlet valve 88 disposed in combination with an exhaust outlet valve motor 89. The exhaust outlet valve motor 89 is electrically connected to the system controller 12 such that the system controller 12 controls the opening and closing of the exhaust outlet valve 88. When the exhaust outlet valve 88 is in the open position, cabin air is allowed to exit the helicopter, and when the exhaust outlet valve 88 is in the closed position, cabin air is prevented from exiting the helicopter and is instead directed towards the cabin air recirculation inlet 87.

In the described embodiment, the ambient air inlet valve assembly 74 is positioned such that the ambient air inlet valve 78 also serves as a valve in combination with the cabin air recirculation inlet 87. In operation, when the ambient air inlet valve 78 is in the open position for the ambient air inlet sub-system 70, the ambient air inlet valve 78 concurrently restricts the flow of cabin air through the cabin air recirculation inlet 87. Conversely, when the ambient air inlet valve 78 is in the closed position for the ambient air inlet sub-system 70, the ambient air inlet valve 78 concurrently allows the flow of cabin air through the cabin air recirculation inlet 87. If the ambient air inlet valve 78 is in this latter position, and if the exhaust outlet valve 88 is in the closed position, then cabin air entering the exhaust sub-system 80 through the exhaust inlet 82 is recirculated back into the primary and secondary ducts 42, 52 through the cabin air recirculation inlet 87. If the ambient air inlet valve 78 is in the open position, and if the exhaust outlet valve 88 is in the open position, then ambient air is allowed to enter the primary and secondary ducts 42, 52, and cabin air is directed out of the helicopter through the exhaust outlet 85. As noted above, the system controller 12 controls both the ambient air inlet valve motor 79 and the exhaust outlet valve motor 89, thereby giving the system controller 12 control over the flow of ambient air into the helicopter, and control over whether cabin air is recirculated into the primary and secondary ducts 42, 52 or exhausted out of the helicopter through the exhaust outlet 85.

Figure 2G:
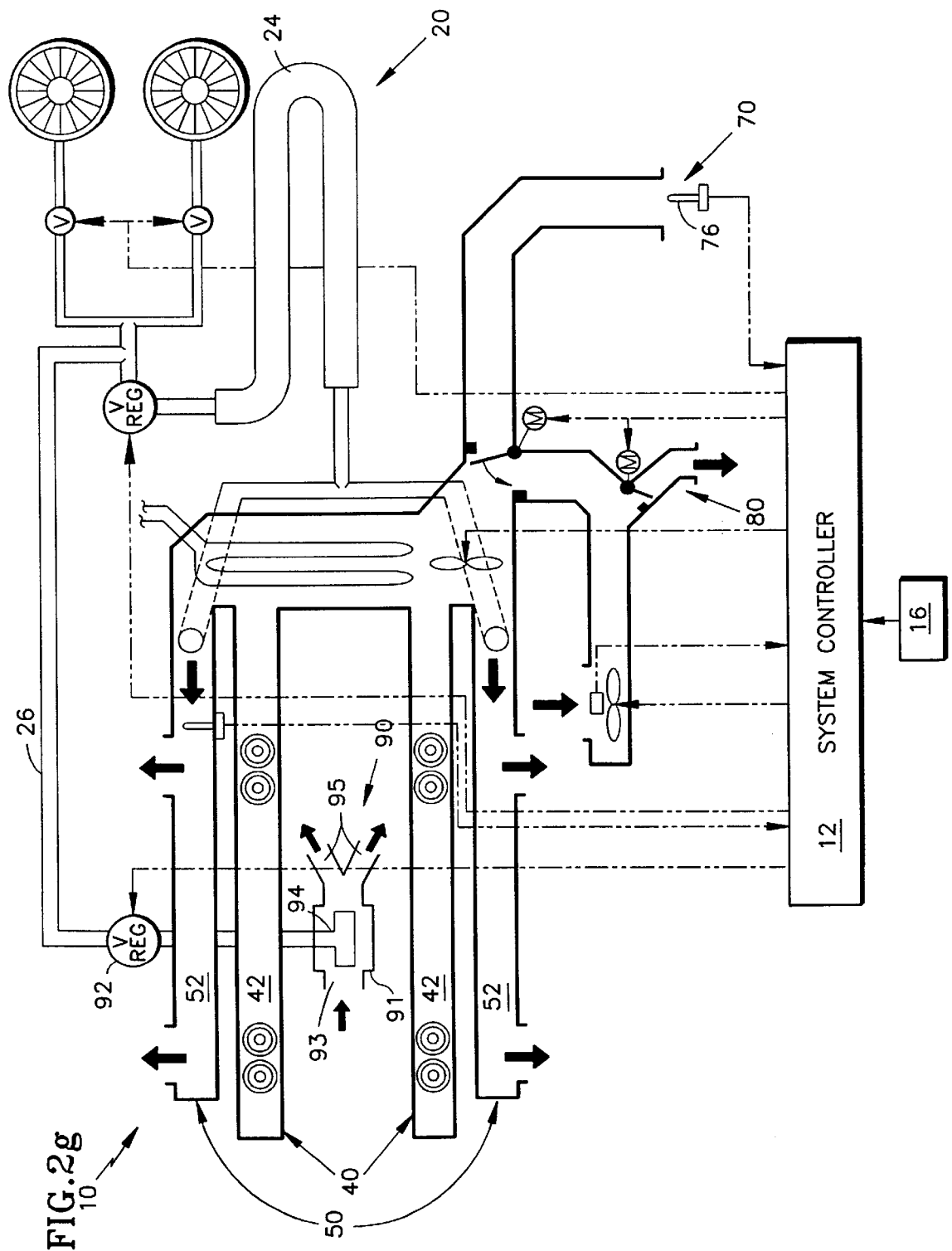
FIG. 2g is a schematic view of the auxiliary heating sub-system depicted in FIG. 2.

Referring to FIG. 2g, the auxiliary heating sub-system 90 comprises an auxiliary heater 91 and an auxiliary heater regulator valve assembly 92, both being disposed in combination with the second bleed air conduit 26 such that the auxiliary heater regulator valve assembly 92 regulates the flow of hot bleed air to the auxiliary heater 91. The structure and functionality of the auxiliary heater regulator valve assembly 92 is equivalent to the regulator valve assembly 100 described above. The auxiliary heater regulator valve assembly 92 is electrically connected to the system controller 12 such that the system controller 12 controls the flow of hot bleed air to the auxiliary heater 91. The auxiliary heater 91 comprises a cabin air inlet 93, a bleed air inlet 94, and an auxiliary heater outlet 95. In operation, as hot bleed air enters the auxiliary heater 91 through the bleed air inlet 94, a venturi effect is produced in combination with cabin air drawn into the auxiliary heater 91 through the cabin air inlet 93, thereby entraining and mixing cabin air with the flow of hot bleed air. This mixture is then directed through the auxiliary heater outlet 95 into the cabin.

In addition to receiving electrical signals from the various sensors 58, 76, 84 disposed within the automatic cabin temperature control system 10 as depicted in FIGS. 2a–g, and in addition to sending various electrical signals to the valves 28, regulator valve assemblies 100, 92, motors 79, 89, and fans 66, 83, the system controller 12 is also preprogrammed with values for switch point temperatures for use in the method illustrated in FIG. 1. Although the relevance of the switch point temperatures will be fully discussed below, the following table summarizes the titles of these switch point temperatures.

| Switch Point | Abbreviation |
| --- | --- |
| First ambient air switch point temperature | $T_{AIR\ SP1}$ |
| Second ambient air switch point temperature | $T_{AIR\ SP2}$ |
| Air conditioning switch point temperature | $T_{AC\ SP}$ |
| First heating switch point temperature | $T_{HEAT\ SP1}$ |
| Second heating switch point temperature | $T_{HEAT\ SP2}$ |

Referring to FIGS. 1 and 2, the method for automatically controlling cabin air temperature $T_{CBN}$ in an aircraft, embodying features of the present invention, will now be fully described, by way of example, using the previously described automatic cabin temperature control system 10 for the S-76 helicopter. It will be appreciated that the method steps described below are carried out by the system controller 12 operating in combination with the various components of the system 10.

In step 202, a selected cabin air temperature $T_{CBN\ SEL}$ is defined, e.g., manually input by a passenger, and serves as a desired air temperature for the cabin. In the described embodiment, the selected cabin air temperature $T_{CBN\ SEL}$ is input into a master control panel 16 which is electrically connected to the system controller 12. At decision point 204, the ambient air temperature, as sensed by the ambient air temperature sensor 76, is compared by the system controller 12 to the first ambient air switch point temperature $T_{AIR\ SP1}$ in order to determine whether the air conditioning mode 300 or the heating mode 400 should be initiated, or whether there should be a switch from one mode 300, 400 to the other mode 300, 400. The value of the first ambient air switch point temperature $T_{AIR\ SP1}$ is preprogrammed into the system controller 12 to account for the aircraft's anticipated ambient and operational conditions and provides for an appropriate switch point between the air conditioning mode 300 and the heating mode 400.

In the described embodiment for the S-76 helicopter, the value of the first ambient air switch point temperature $T_{AIR\ SP1}$ depends upon which mode 300, 400 is being initiated. If the outside air temperature is increasing, and if the heating mode 400 is already in operation, the air conditioning mode 300 will initiate at a first ambient air switch point temperature $T_{AIR\ SP1}$ of approximately 11° C. (52° F.). If the outside air temperature is decreasing, and if the air conditioning mode 300 is already in operation, the heating mode 400 will initiate at a first ambient air switch point temperature $T_{AIR\ SP1}$ of approximately 7° C. (45° F.). The approximately 4° C. (7° F.) difference between the first ambient air switch point temperatures $T_{AIR\ SP1}$ for the air conditioning mode 300 and the heating mode 400 provides a temperature buffer for the prevention of mode cycling. In other words, if there was a single first ambient air switch point temperature $T_{AIR\ SP1}$, the system controller 12 would continuously cycle, i.e. switch, between the air conditioning mode 300 and the heating mode 400 in response to very minor ambient air temperature changes.

At decision point 204, if the ambient air temperature is greater than the first ambient air switch point temperature $T_{AIR\ SP1}$, the system controller 12 ensures that the air conditioning mode 300 is initiated. If the ambient air temperature is equal to or less than the first ambient air switch point temperature $T_{AIR\ SP1}$, the system controller 12 ensures that the heating mode 400 is initiated. Following the selection and carrying out of the appropriate mode 300, 400, a return step 206 returns the method to decision point 204.

Referring to FIGS. 2a–f and 3, the air conditioning mode 300 will now be discussed in greater detail. In step 302, the system controller 12 ensures that the ambient air inlet valve 78 and the exhaust outlet valve 88 are closed, such that ambient air is prevented from entering the helicopter, and cabin air is recirculated. In step 304, the system controller 12 ensures that the compressor 62 is active, thereby pumping refrigerant into the evaporator coils 64. At decision point 306, the system controller 12 compares the cabin air temperature $T_{CBN}$, as sensed by the cabin air temperature sensor 84, with the selected cabin air temperature $T_{CBN\ SEL}$. If the cabin air temperature $T_{CBN}$ is less than the selected cabin air temperature $T_{CBN\ SEL}$, the system controller 12 initiates a first cooling sub-mode 310 comprising steps 312, 314, and 316. If the cabin air temperature $T_{CBN}$ is equal to or greater than the selected cabin air temperature $T_{CBN\ SEL}$, the system controller 12 initiates a second cooling sub-mode 320 comprising steps 322, 324, 326, and 328. It is important to note that although it may seem counter-intuitive to initiate an air conditioning sub-mode when the cabin air temperature $T_{CBN}$ is less than the selected cabin air temperature $T_{CBN\ SEL}$, the first cooling sub-mode 310 is necessary in order to counteract the effects of ambient conditions that would otherwise cause a rise in the cabin air temperature $T_{CBN}$ such that the cabin air temperature $T_{CBN}$ would exceed the selected cabin air temperature $T_{CBN\ SEL}$.

After selection of the appropriate cooling sub-mode 310, 320, the air conditioning mode 300 exits at step 330 into the return step 206 of FIG. 1.

Reference is now made to FIGS. 2a–f and 3, and in particular, the first cooling sub-mode 310. In step 312 the system controller 12 ensures that the speed of the evaporator fan 66 is set to low. Since the compressor 62 is active, and since the evaporator fan 66 is set to the low speed, a flow of cool air is directed into the primary and secondary ducts 42, 52. In step 314, the system controller 12 ensures that the bleed air shutoff valves 28 are open, such that hot bleed air is allowed to enter the first bleed air conduit 24. As previously noted, hot bleed air is delivered into the secondary ducts 52 with the use of baffles 54 connected to the first bleed air conduit 24. Upon entering the secondary ducts 52, the hot bleed air mixes with the flow of cool air delivered into the secondary ducts 52 by the air conditioning subsystem 60 and forms mixed air having an actual mixed air temperature $T_{MIX\ ACT}$. The secondary duct temperature sensor 58 senses the temperature of the mixed air and sends an electrical signal to the system controller 12 indicative of the actual mixed air temperature $T_{MIX\ ACT}$.

In step 316, the hot bleed air is regulated by the regulator valve assembly 100 such that the actual mixed air temperature $T_{MIX\ ACT}$ in the secondary ducts 52 is driven toward a target mixed air temperature $T_{MIX\ TRGT}$ defined as:

$$k(T_{CBN\ SEL} - T_{CBN}) + T_{CBN\ SEL} \qquad (1)$$

As illustrated in Equation 1, the target mixed air temperature $T_{MIX\ TRGT}$ is not set equal to the selected cabin air temperature $T_{CBN\ SEL}$. Although it is desirable for the cabin air temperature $T_{CBN}$ to eventually equal the selected cabin air temperature $T_{CBN\ SEL}$, it does not follow that the target mixed air temperature $T_{MIX\ TRGT}$ should equal the selected cabin air temperature $T_{CBN\ SEL}$. If the cabin air temperature $T_{CBN}$ was primarily influenced by the temperature of the mixed air exiting the secondary ducts 52, then it would be desirable for the target mixed air temperature $T_{MIX\ TRGT}$ to equal the selected cabin air temperature $T_{CBN\ SEL}$, since circulation of the mixed air about the cabin would eventually modify the cabin air temperature $T_{CBN}$ so as to equal the selected cabin air temperature $T_{CBN\ SEL}$. However, as noted previously, the cabin air temperature $T_{CBN}$ is influenced by a number of factors, including the temperature of the cool air exiting the primary ducts 42, cabin heating from exposure to solar radiation, cabin cooling from cloud cover, ambient air temperature changes, and heat losses through the aircraft structure. Therefore, the target mixed air temperature $T_{MIX\ TRGT}$ must be defined such that as the mixed air is circulated about the cabin, the cabin air temperature $T_{CBN}$ approaches the selected cabin air temperature $T_{CBN\ SEL}$.

As illustrated in Equation 1, a temperature compensating term, $k(T_{CBN\ SEL} - T_{CBN})$, is added to the selected cabin air temperature $T_{CBN\ SEL}$ in order to compensate for the aforementioned factors that influence the cabin air temperature $T_{CBN}$. Within the temperature compensating term, the cabin air temperature $T_{CBN}$ is subtracted from the selected cabin air temperature $T_{CBN\ SEL}$, and then the resultant is multiplied by a gain factor k. The effect of the temperature compensating term is to increase the value of the target mixed air temperature $T_{MIX\ TRGT}$ such that the cabin air temperature $T_{CBN}$ more rapidly approaches the selected cabin air temperature $T_{CBN\ SEL}$. In particular, the gain factor k serves to amplify the compensating term such that the target mixed air temperature $T_{MIX\ TRGT}$ can be rapidly adjusted to meet the dynamic cabin air temperature $T_{CBN}$ changes typically encountered by helicopters and other aircraft. In the described embodiment for the S-76 helicopter, a gain factor k of three was found to provide the best amplification to the compensating term. This need for rapid adjustment is in marked contrast to prior art climate control systems for motor vehicles and homes, wherein rapid interior temperature adjustments are not necessary since ambient and operating conditions of motor vehicles and homes are not as dynamic as those associated with aircraft.

Since the temperature and flow rate of the cool air in the secondary ducts 52 are held substantially constant for a selected evaporator fan speed, it follows that driving the actual mixed air temperature $T_{MIX\ ACT}$ toward the target mixed air temperature $T_{MIX\ TRGT}$ must be accomplished by regulating the flow of hot bleed air into the secondary ducts 52 using the regulator valve assembly 100. However, since the temperature and flow rate of the hot bleed air is also a direct function of the engine power setting, it becomes very difficult to predict changes in the actual mixed air temperature $T_{MIX\ ACT}$ based solely on predefined discrete adjustments in the regulator valve assembly 100.

Figure 3A:
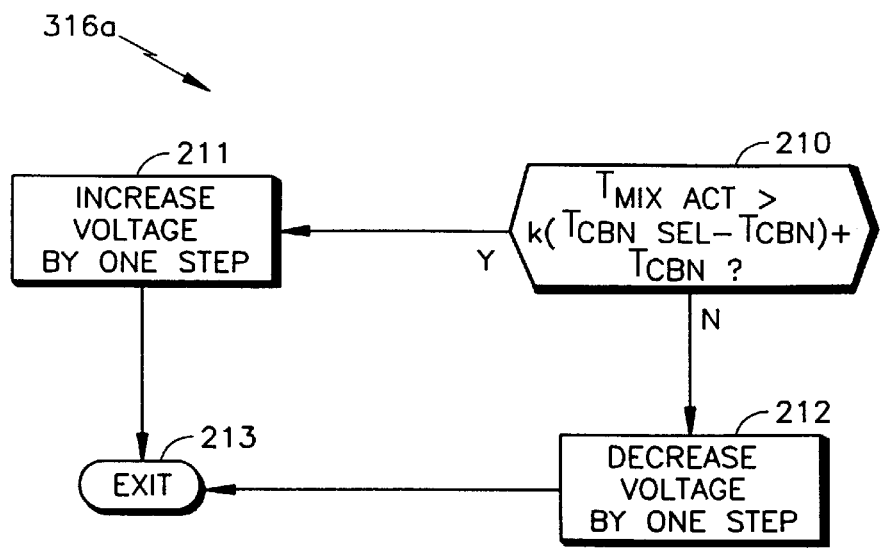
FIG. 3a is a flowchart diagram illustrating a mixing routine for use with the air conditioning mode illustrated in FIG. 3.

For the described embodiment, step 316 can be implemented using a mixing routine 316a as shown in FIG. 3a. The mixing routine 316a incrementally adjusts the regulator valve assembly 100a, thereby producing an actual mixed air temperature $T_{MIX\ ACT}$ that is driven toward the target mixed air temperature $T_{MIX\ TRGT}$. At decision point 210, the system controller 12 compares the value of the actual mixed air temperature $T_{MIX\ ACT}$ to the calculated value of the target mixed air temperature $T_{MIX\ TRGT}$. If the actual mixed air temperature $T_{MIX\ ACT}$ is greater than the target mixed air temperature $T_{MIX\ TRGT}$, then in step 211, the system controller 12 increases the voltage to the solenoid-operated proportional valve 104 by one step. If the actual mixed air temperature $T_{MIX\ ACT}$ is equal to or less than the target mixed air temperature $T_{MIX\ TRGT}$, then in step 212, the system controller 12 decreases the voltage to the solenoid-operated proportional valve 104 by one step. As previously noted, each increase or decrease in voltage from the system controller 12 to the solenoid-operated proportional valve 104 results in linear translation of the plunger 108 within the solenoid-operated proportional valve 104, thereby affecting the flow rate of the hot bleed air passing through the regulator valve 102. The mixing routine 316a exits at exit step 213 into step 330 of FIG. 3.

Multiple iterations of the first cooling sub-mode 310 and accordingly, the mixing routine 316a, drives the actual mixed air temperature $T_{MIX\ ACT}$ toward the target mixed air temperature $T_{MIX\ TRGT}$. It is important to note that not only does the actual mixed air temperature $T_{MIX\ ACT}$ change upon each iteration of the mixing routine 316a, but also, the target mixed air temperature $T_{MIX\ TRGT}$ changes upon each iteration in response to changes in the cabin air temperature $T_{CBN}$. Therefore, the system controller 12 continuously processes sensor readings from the cabin air temperature sensor 84 and the secondary duct temperature sensor 58, and accordingly recalculates and compares the actual mixed air temperature $T_{MIX\ ACT}$ to the target mixed air temperature $T_{MIX\ TRGT}$.

It will be appreciated that the mixing routine 316a is also capable of addressing dynamic changes in the actual mixed air temperature $T_{MIX\ ACT}$ caused by changes in the power settings of the turbine engines 22. When the temperature and/or flow rate of the hot bleed air entering the secondary ducts 52 changes during operation of the mixing routine 316a, the system controller 12 receives from the secondary duct temperature sensor 58 the resultant change in the actual mixed air temperature $T_{MIX\ ACT}$, and effectuates operation of the solenoid-operated proportional valve 104, as described above, in order to drive the actual mixed air temperature $T_{MIX\ ACT}$ to the target mixed air temperature $T_{MIX\ TRGT}$.

Figure 3:
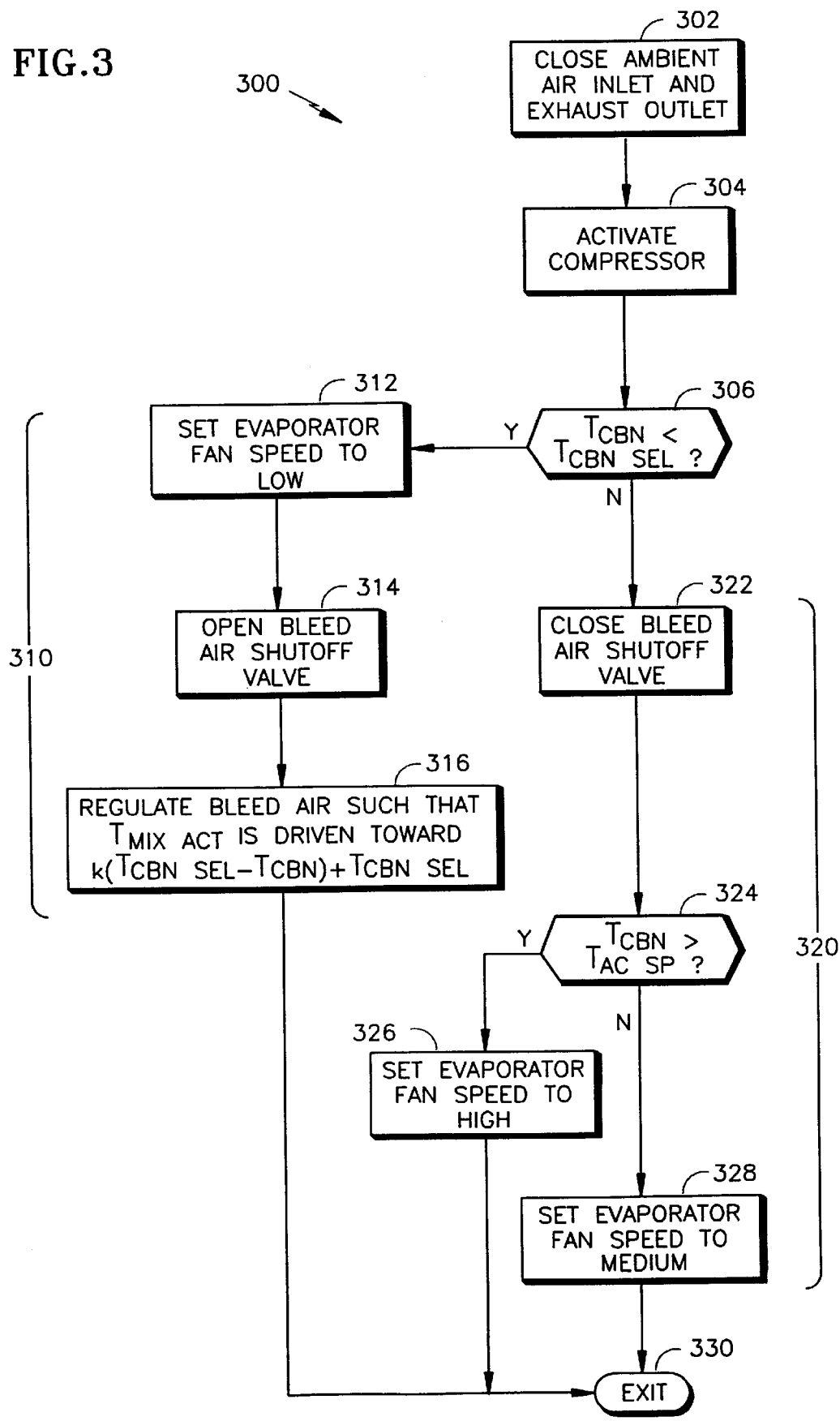
FIG. 3 is a flowchart diagram of the air conditioning mode illustrated in FIG. 1.

As illustrated in FIG. 3, upon completion of step 316, the air conditioning mode 300 exits at step 330, and the method of the present invention continues with return step 206, as illustrated in FIG. 1.

Reference is now made to FIGS. 2a–f and 3, wherein the second cooling sub-mode 320 will now be discussed in greater detail. In step 322, the system controller 12 ensures that the bleed air shutoff valves 28 are closed, thereby preventing the flow of hot bleed air into either of the bleed air conduits 24, 26. At decision point 324, the system controller 12 compares the cabin air temperature $T_{CBN}$ to the preprogrammed air conditioning switch point temperature $T_{AC\ SP}$. If the cabin air temperature $T_{CBN}$ is greater than the air conditioning switch point temperature $T_{AC\ SP}$, then in step 326, the system controller 12 ensures that the speed of the evaporator fan 66 is set to high. If the cabin air temperature $T_{CBN}$ is equal to or less than the air conditioning switch point temperature $T_{AC\ SP}$, then in step 328, the system controller 12 ensures that the speed of the evaporator fan 66 is set to medium. In steps 326 and 328, since the bleed air shutoff valves 28 are closed, and since the compressor 62 is active, the evaporator fan 66 produces a flow of cool air into the primary and secondary ducts 42, 52. The difference between steps 326 and 328 is the speed of the evaporator fan 66, and accordingly, the flow rate of the cool air.

The value of the air conditioning switch point temperature $T_{AC\ SP}$ is preprogrammed into the system controller 12 to account for the aircraft's anticipated ambient and operational conditions and provides an appropriate switch point between the medium and high evaporator fan speeds and the resultant changes in the flow rate of cool air. In the described embodiment for the S-76 helicopter, the value of the air conditioning switch point temperature $T_{AC\ SP}$ depends upon the initial evaporator fan speed and whether the cabin air temperature $T_{CBN}$ is increasing or decreasing. In the situation where the evaporator fan speed is initially set to medium, and the cabin air temperature $T_{CBN}$ is increasing, the air conditioning switch point temperature $T_{AC\ SP}$ for switching to high speed is the selected cabin air temperature $T_{CBN\ SEL}$ plus approximately 3° C. (6° F.). In the situation where the evaporator fan speed is initially set to high, and the cabin air temperature $T_{CBN}$ is decreasing, the air conditioning switch point temperature $T_{AC\ SP}$ for switching to medium speed is the selected cabin air temperature $T_{CBN\ SEL}$ plus approximately 2° C. (3° F.).

As illustrated in FIG. 3, upon completion of steps 326 or 328, the air conditioning mode 300 is exited at step 330, and the method of the present invention continues with return step 206, as illustrated in FIG. 1.

Referring to FIGS. 2a–g and 4, the heating mode 400 will now be discussed in greater detail. In step 401, the system controller ensures that the compressor 62 is inactive, thereby terminating the flow of refrigerant into the evaporator coils 64. In step 402, the system controller 12 ensures that the bleed air shutoff valves 28 are open, such that hot bleed air is allowed to enter the first and second bleed air conduits 24, 26. At decision point 404 the system controller 12 compares the cabin air temperature $T_{CBN}$ with the first heating switch point temperature $T_{HEAT\ SP1}$. If the cabin air temperature $T_{CBN}$ is less than the first heating switch point temperature $T_{HEAT\ SP1}$, then at step 406, the system controller 12 ensures that the speed of the evaporator fan 66 is set to low. If the cabin air temperature $T_{CBN}$ is equal to or greater than the first heating switch point temperature $T_{HEAT\ SP1}$, then at step 408, the system controller 12 ensures that the speed of the evaporator fan 66 is set to high.

The value of the first heating switch point temperature $T_{HEAT\ SP1}$ is preprogrammed into the system controller 12 to account for the aircraft's anticipated ambient and operational conditions and provides an appropriate switch point between the low and high evaporator fan speeds and the resultant changes in the flow of ambient or recirculated air. In the described embodiment for the S-76 helicopter, the value of the first heating switch point temperature $T_{HEAT\ SP1}$ depends upon the initial evaporator fan speed and whether the cabin air temperature $T_{CBN}$ is increasing or decreasing. In the situation where the evaporator fan speed is initially set to low, and the cabin air temperature $T_{CBN}$ is increasing, the first heating switch point temperature $T_{HEAT\ SP1}$ for switching to high speed is the selected cabin air temperature $T_{CBN\ SEL}$ plus approximately 2° C. (4° F.). In the situation where the evaporator fan speed is initially set to high, and the cabin air temperature $T_{CBN}$ is decreasing, the first heating switch point temperature $T_{HEAT\ SP1}$ for switching to low speed is the selected cabin air temperature $T_{CBN\ SEL}$.

At decision point 410, the ambient air temperature is compared to the second ambient air switch point temperature $T_{AIR\ SP2}$. If the ambient air temperature is less than the second ambient air switch point temperature $T_{AIR\ SP2}$, then at step 412, the system controller 12 ensures that the ambient air inlet valve 78 and the exhaust outlet valve 88 are both in the closed position. As noted earlier, when the ambient air inlet valve 78 and the exhaust outlet valve 88 are both in the closed position, the cabin air is recirculated through the cabin air recirculation inlet 87.

If the ambient air temperature is equal to or greater than the second ambient air switch point temperature $T_{AIR\ SP2}$, then at step 414, the system controller 12 ensures that the ambient air inlet valve 78 and the exhaust outlet valve 88 are both in the open position. As noted earlier, when the ambient air inlet valve 78 and the exhaust outlet valve 88 are both in the open position, ambient air is drawn into the aircraft through the ambient air inlet 72 and exhausted out of the aircraft through the exhaust outlet 85.

The value of the second ambient air switch point temperature $T_{AIR\ SP2}$ is preprogrammed into the system controller 12 to account for the aircraft's anticipated ambient and operational conditions and provides for an appropriate switch point between the opening and closing of the ambient air inlet valve 78 and the exhaust outlet valve 88, and takes into account the resultant changes in the introduction of ambient or recirculated air within the cabin. In the described embodiment for the S-76 helicopter, the value of the second ambient air switch point temperature $T_{AIR\ SP2}$ depends upon the initial configuration of the ambient air inlet valve 78 and the exhaust outlet valve 88, and whether the ambient air temperature is increasing or decreasing. In the situation where the ambient air inlet valve 78 and the exhaust outlet valve 88 are both initially in the closed position, and the ambient air temperature is increasing, the second ambient air switch point temperature $T_{AIR\ SP2}$ for switching the ambient air inlet valve 78 and the exhaust outlet valve 88 to the open position is approximately 2° C. (35° F.). In the situation where the ambient air inlet valve 78 and the exhaust outlet valve 88 are both initially in the open position, and the ambient air temperature is decreasing, the second ambient air switch point temperature $T_{AIR\ SP2}$ for switching the ambient air inlet valve 78 and the exhaust outlet valve 88 to the closed position is approximately 4° C. (25° F.).

In step 416, the hot bleed air is regulated by the regulator valve assembly 100 such that actual mixed air temperature $T_{MIX\ ACT}$ of the mixed air in the secondary ducts 52 is driven toward the target mixed air temperature $T_{MIX\ TRGT}$ as defined in Equation 1.

The method for regulating the hot bleed air, thereby producing mixed air, is substantially the same method as noted above for the first cooling sub-mode 310 of the air conditioning mode 300. However, a difference exists between the two methods as to the nature of the air mixed with the hot bleed air. As described above, in the air conditioning mode 300, the hot bleed air is mixed with cool air from air conditioning sub-system 60, thereby producing mixed air. In the heating mode 400, the nature of the air mixed with the hot bleed air depends upon the outcome at decision point 410. If the ambient air inlet valve 78 and the exhaust outlet valve 88 are both in the closed position, then recirculated cabin air is mixed with hot bleed air to produce mixed air. If the ambient air inlet valve 78 and the exhaust outlet valve 88 are both in the open position, then ambient air is mixed with the hot bleed air to produce mixed air.

At decision point 418, the cabin air temperature $T_{CBN}$ is compared to a second heating switch point temperature $T_{HEAT\ SP2}$. If the cabin air temperature $T_{CBN}$ is less than the second heating switch point temperature $T_{HEAT\ SP2}$, then at step 420, the system controller 12 ensures that the auxiliary heating sub-system 90 is active. In addition to ensuring that the auxiliary heating sub-system 90 is active, in the described embodiment for a S-76 helicopter, if the cabin air temperature $T_{CBN}$ is approximately 2° C. (3° F.) or greater below the selected cabin air temperature $T_{CBN\ SEL}$, then the system controller 12 will also regulate the flow of hot bleed air into the auxiliary heater 91 by delivering appropriate voltage steps to the auxiliary heater regulator valve assembly 92. As with the method described above for regulating hot bleed air through the regulator valve assembly 100, the voltage steps delivered by the system controller 12 to the auxiliary heater regulator valve assembly 92 increases or decreases depending upon the desired cabin air temperature $T_{CBN}$ adjustments. When the cabin air temperature $T_{CBN}$ increases to a point where it is less than approximately 2° C. (3° F.) below the selected cabin air temperature $T_{CBN\ SEL}$, the system controller 12 freezes the setting of the auxiliary heater regulator valve assembly 92 such that there are no further changes in the flow rate of hot bleed air into the cabin.

If the cabin air temperature $T_{CBN}$ is equal to or greater than the second heating switch point temperature $T_{HEAT\ SP2}$, then at step 422, the system controller 12 ensures that the auxiliary heating sub-system 90 is inactive. The value of the second heating switch point temperature $T_{HEAT\ SP2}$ is preprogrammed into the system controller 12 to account for the aircraft's anticipated ambient and operational conditions and provides for an appropriate switch point for providing additional heat into the cabin using hot bleed air.

Figure 4:
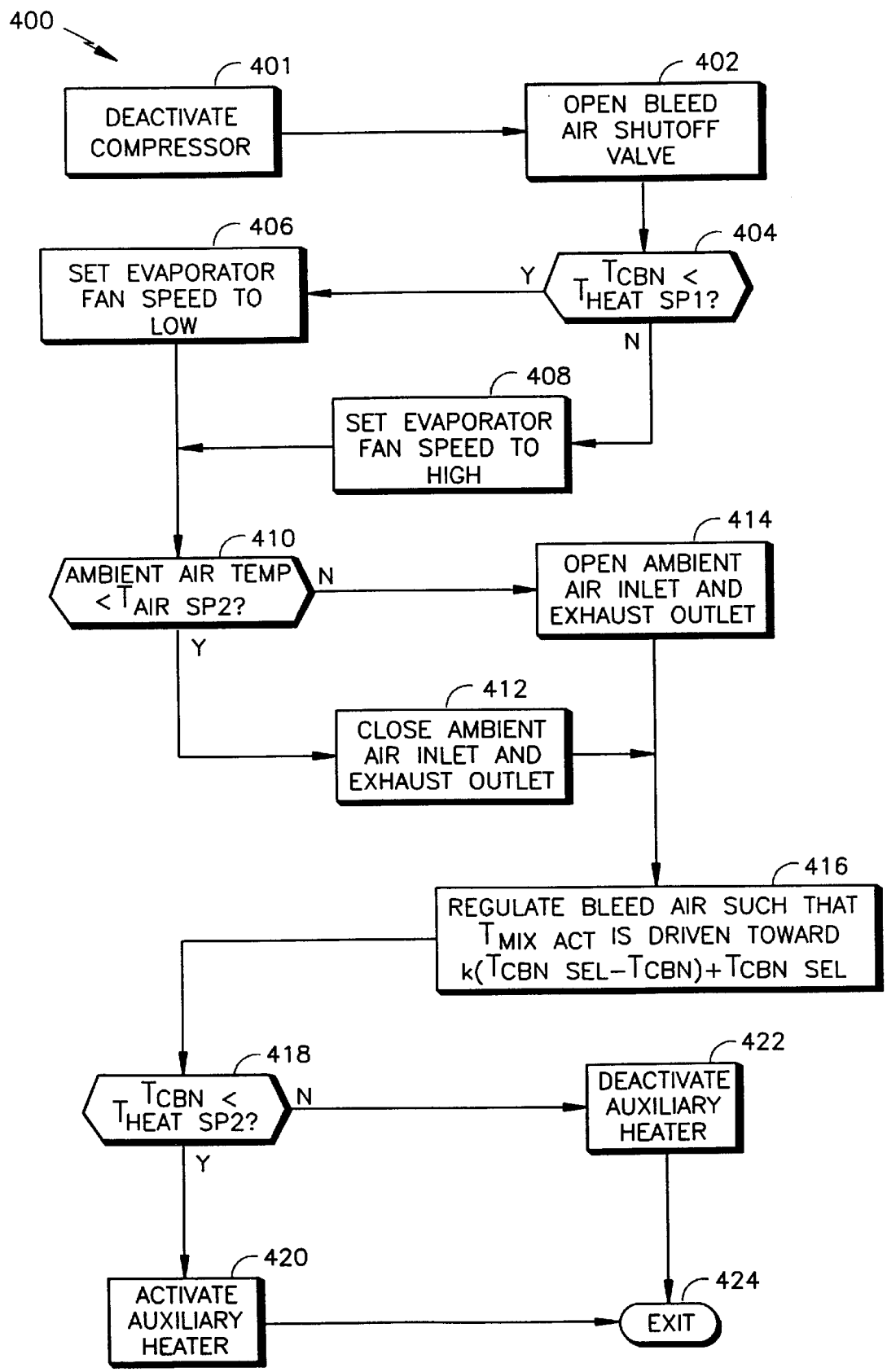
FIG. 4 is a flowchart diagram of the heating mode illustrated in FIG. 1.

As illustrated in FIG. 4, upon completion of steps 420 or 422, the heating mode 400 is exited at step 424, and the method of the present invention continues with return step 206, as illustrated in FIG. 1.

In alternative embodiments, various systems may be used to carry out the method of the present invention. In alternative embodiments, the number, orientation, and operational characteristics of ducts, fans, and valves may be altered from those disclosed in the described embodiment for the S-76 helicopter. In alternative embodiments, the flow rate and temperatures of the hot bleed air, cool air, ambient air, and recirculated cabin air may be regulated relative to each other using various arrangements of fans and/or valves in order to produce the desired mixed air temperatures. In addition, although in the described embodiment the system controller electrically controls the operation of the system, in alternative embodiments, various combinations of electrical, mechanical, electromechanical, and/or hydraulic systems may be used to operate and control the system.

In alternative embodiments, the switch point temperatures can be selected such that they address the operational requirements of each system. In some embodiments, the switch point temperatures may be preprogrammed, manually input, or dynamically modified electronically by a system controller. In some embodiments, the system for automatically controlling cabin temperature in an aircraft may be a component of a larger heating and air conditioning system for an aircraft having both automatic and manual temperature control modes. In this embodiment, the automatic temperature control mode may be overridden by activating a particular manual heating or air conditioning mode.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited by the definition contained in the appended claims and equivalents thereof.

What is claimed is:

1. A method for automatically controlling cabin air temperature in an aircraft having an ambient air inlet, an exhaust outlet, an auxiliary heater, a turbine engine providing a flow of hot bleed air, a bleed air shutoff valve, a regulator valve assembly for regulating said flow of hot bleed air, and an air conditioning sub-system for providing a flow of cool air, said air conditioning sub-system having a compressor, evaporator, and an evaporator fan having low, medium and high speeds, said method comprising the steps of:

(a) defining a selected cabin air temperature $T_{CBN\ SEL}$ (b) sensing an ambient air temperature;

(c) comparing said ambient air temperature with a first ambient air switch point temperature;

(d) ensuring that an air conditioning mode is initiated if said ambient air temperature is greater than said first ambient air switch point temperature, the air conditioning mode including the steps of
   ensuring that said ambient air inlet is closed,
   ensuring that said exhaust outlet is closed,
   ensuring that said compressor is activated,
   sensing a cabin air temperature $T_{CBN}$,
   comparing said cabin air temperature with said selected cabin air temperature,
   ensuring that a first cooling sub-mode is initiated if said cabin air temperature is less than said selected cabin air temperature, and
   ensuring that a second cooling sub-mode is initiated if said cabin air temperature is equal to or greater than said selected cabin air temperature;

(e) ensuring that a heating mode is initiated if said ambient air temperature is equal to or less than said first ambient air switch point temperature; and (f) returning to said ambient air temperature sensing step.

2. A method for automatically controlling cabin air temperature in an aircraft having an ambient air inlet, an exhaust outlet, an auxiliary heater, a turbine engine providing a flow of hot bleed air, a bleed air shutoff valve, a regulator valve assembly for regulating said flow of hot bleed air, and an air conditioning sub-system for providing a flow of cool air, said air conditioning sub-system having a compressor, evaporator, and an evaporator fan having low, medium and high speeds, said method comprising the steps of:

defining a selected cabin air temperature $T_{CBN\ SEL}$ sensing an ambient air temperature;

comparing said ambient air temperature with a first ambient air switch point temperature;

ensuring that an air conditioning mode is initiated if said ambient air temperature is greater than said first ambient air switch point temperature, the air conditioning mode including the steps of ensuring that said ambient air inlet is closed, ensuring that said exhaust outlet is closed, ensuring that said compressor is activated, sensing a cabin air temperature $T_{CBN}$, comparing said cabin air temperature with said selected cabin air temperature, ensuring that a first cooling sub-mode is initiated if said cabin air temperature is less than said selected cabin air temperature, and ensuring that a second cooling sub-mode is initiated if said cabin air temperature is equal to or greater than said selected cabin air temperature;

ensuring that a heating mode is initiated if said ambient air temperature is equal to or less than said first ambient air switch point temperature; and returning to said ambient air temperature sensing step wherein said first cooling sub-mode comprises the steps of:

ensuring that said evaporator fan is set to said low speed, thereby providing for said flow of cool air from said air conditioning subsystem;

ensuring that said bleed air shutoff valve is open to provide said flow of hot bleed air;

mixing said flow of hot bleed air with said flow of cool air to produce a flow of mixed air having an actual mixed air temperature; and regulating said flow of hot bleed air with said regulator valve assembly such that said actual mixed air temperature is driven toward a target mixed air temperature.

3. The method of claim 2, wherein said target mixed air temperature is defined as $k(T_{CBN\ SEL} - T_{CBN}) + T_{CBN\ SEL}$, wherein k is a gain factor.

4. The method of claim 3, wherein said gain factor equals three.

5. A method for automatically controlling cabin air temperature in an aircraft having an ambient air inlet, an exhaust outlet, an auxiliary heater, a turbine engine providing a flow of hot bleed air, a bleed air shutoff valve, a regulator valve assembly for regulating said flow of hot bleed air, and an air conditioning sub-system for providing a flow of cool air, said air conditioning sub-system having a compressor, evaporator, and an evaporator fan having low, medium and high speeds, said method comprising the steps of:

defining a selected cabin air temperature $T_{CBN\ SEL}$ sensing an ambient air temperature;

comparing said ambient air temperature with a first ambient air switch point temperature;

ensuring that an air conditioning mode is initiated if said ambient air temperature is greater than said first ambient air switch point temperature, the air conditioning mode including the steps of ensuring that said ambient air inlet is closed, ensuring that said exhaust outlet is closed, ensuring that said compressor is activated, sensing a cabin air temperature $T_{CBN}$, comparing said cabin air temperature with said selected cabin air temperature, ensuring that a first cooling sub-mode is initiated if said cabin air temperature is less than said selected cabin air temperature, and ensuring that a second cooling sub-mode is initiated if said cabin air temperature is equal to or greater than said selected cabin air temperature;

ensuring that a heating mode is initiated if said ambient air temperature is equal to or less than said first ambient air switch point temperature; and returning to said ambient air temperature sensing step wherein said second cooling sub-mode comprises the steps of:

ensuring that said bleed air shutoff valve is closed;

comparing said cabin air temperature with an air conditioning switch point temperature;

ensuring that said evaporator fan is set to said high speed if said cabin air temperature is greater than said air conditioning switch point temperature; and ensuring that said evaporator fan is set to said medium speed if said cabin air temperature is equal to or less than said air conditioning switch point temperature.

6. A method for automatically controlling cabin air temperature in an aircraft having an ambient air inlet, an exhaust outlet, an auxiliary heater, a turbine engine providing a flow of hot bleed air, a bleed air shutoff valve, a regulator valve assembly for regulating said flow of hot bleed air, and an air conditioning sub-system for providing a flow of cool air, said air conditioning sub-system having a compressor, evaporator, and an evaporator fan having low, medium and high speeds, said method comprising the steps of:

defining a selected cabin air temperature $T_{CBN\ SEL}$ sensing an ambient air temperature;

comparing said ambient air temperature with a first ambient air switch point temperature;

ensuring that an air conditioning mode is initiated if said ambient air temperature is greater than said first ambient air switch point temperature;

ensuring that a heating mode is initiated if said ambient air temperature is equal to or less than said first ambient air switch point temperature; and returning to said ambient air temperature sensing step;

wherein said heating mode comprises the steps of (a) ensuring that said compressor is inactivated;

(b) ensuring that said bleed air shutoff valve is open to provide said flow of hot bleed air;

(c) sensing a cabin air temperature $T_{CBN}$;

(d) comparing said cabin air temperature with a first heating switch point temperature;

(e) ensuring that said evaporator fan is set to said low speed if said cabin air temperature is less than said first heating switch point temperature;

(f) ensuring that said evaporator fan is set to said high speed if said cabin air temperature is equal to or greater than said first heating switch point temperature;

(g) comparing said ambient air temperature with a second ambient air switch point temperature;

(h) ensuring that said ambient air inlet is closed and ensuring that said exhaust outlet is closed if said ambient air temperature is less than said second ambient air switch point temperature, wherein said evaporator fan provides a flow of recirculated air;

(i) ensuring that said ambient air inlet is open and ensuring that said exhaust outlet is open if said ambient air temperature is equal to or greater than said second ambient air switch point temperature, wherein said evaporator fan provides a flow of ambient air;

(j) mixing said flow of hot bleed air with said flow of recirculated air to produce a flow of mixed air having an actual mixed air temperature if said ambient air temperature is less than said second ambient air switch point temperature and alternatively, mixing said flow of hot bleed air with said flow of ambient air to produce a flow of mixed air having an actual mixed air temperature if said ambient air temperature is equal to or greater than said second ambient air switch point temperature;

(k) regulating said flow of hot bleed air with said regulator valve assembly such that said actual mixed air temperature is driven toward a target mixed air temperature;

(l) comparing said cabin air temperature with a second heating switch point temperature;

(m) ensuring that said auxiliary heater is activated if said cabin air temperature is less than said second heating switch point temperature; and (n) ensuring that said auxiliary heater is not activated if said cabin air temperature is equal to or greater than said second heating switch point temperature.

7. The method of claim 6, wherein said target mixed air temperature is defined as $k(T_{CBN\ SEL}-T_{CBN})+T_{CBN\ SEL}$, wherein k is a gain factor.

8. The method of claim 7, wherein said gain factor equals three.

* * * * *